(12) United States Patent
Lopez et al.

(10) Patent No.: US 11,163,116 B2
(45) Date of Patent: Nov. 2, 2021

(54) PLANAR LUNEBURG LENS SYSTEM FOR TWO-DIMENSIONAL OPTICAL BEAM STEERING

(71) Applicant: Massachusetts Institute of Technology, Cambridge, MA (US)

(72) Inventors: Josue Lopez, South Gate, CA (US); Samuel Kim, Cambridge, MA (US); Jamison Sloan, Somerville, MA (US); Boris Kharas, Lexington, MA (US); Jeffrey Scott Herd, Rowley, MA (US); Marin Soljacic, Belmont, MA (US); Cheryl Marie Sorace-Agaskar, Bedford, MA (US); Suraj Deepak Bramhavar, Arlington, MA (US); Steven Glenn Johnson, Arlington, MA (US); George Barbastathis, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/804,612

(22) Filed: Feb. 28, 2020

(65) Prior Publication Data
US 2020/0348466 A1    Nov. 5, 2020

Related U.S. Application Data

(60) Provisional application No. 62/840,468, filed on Apr. 30, 2019.

(51) Int. Cl.
*G02B 6/124*     (2006.01)
*G02F 1/295*     (2006.01)
(Continued)

(52) U.S. Cl.
CPC ......... *G02B 6/124* (2013.01); *G02B 6/12004* (2013.01); *G02B 6/125* (2013.01);
(Continued)

(58) Field of Classification Search
None
See application file for complete search history.

(56) References Cited

U.S. PATENT DOCUMENTS

| | | |
|---|---|---|
| 3,108,278 A | 10/1963 | Walter |
| 3,255,454 A | 6/1966 | Walter et al. |

(Continued)

FOREIGN PATENT DOCUMENTS

| | | |
|---|---|---|
| GB | 2524761 B | 9/2018 |
| KR | 100289052 B1 | 5/2001 |

(Continued)

OTHER PUBLICATIONS

Abiri, Behrooz, Firooz Aflatouni, Angad Rekhi, and Ali Hajimiri, "Electronic Two-Dimensional Beam Steering for Integrated Optical Phased Arrays," Optical Society of America, http://authors.library.caltech.edu/60779/1/06886570.pdf, 2014, 3 pages.

(Continued)

*Primary Examiner* — Michelle R Connelly
(74) *Attorney, Agent, or Firm* — Smith Baluch LLP

(57) ABSTRACT

An integrated optical beam steering device includes a planar Luneburg lens that collimates beams from different inputs in different directions within the lens plane. It also includes a curved (e.g., semi-circular or arced) grating coupler that diffracts the collimated beams out of the lens plane. The beams can be steered in the plane by controlling the direction along which the lens is illuminated and out of the plane by varying the beam wavelength. Unlike other beam steering devices, this device can operate over an extremely wide field of view—up to 180°—without any aberrations off (Continued)

boresight. In other words, the beam quality is uniform in all directions, unlike with aplanatic lenses, thanks to the circular symmetry of the planar Luneburg lens, which may be composed of subwavelength features. The lens is also robust to misalignment and fabrication imperfections and can be made using standard CMOS processes.

17 Claims, 17 Drawing Sheets

(51) Int. Cl.
  G02B 6/12      (2006.01)
  G02B 6/125     (2006.01)
(52) U.S. Cl.
  CPC .. *G02F 1/2955* (2013.01); *G02B 2006/12102* (2013.01); *G02B 2006/12107* (2013.01)

(56) References Cited

U.S. PATENT DOCUMENTS

| | | | |
|---|---|---|---|
| 3,386,099 A | | 5/1968 | Walter et al. |
| 3,392,394 A | | 7/1968 | Caballero |
| 3,754,270 A | | 8/1973 | Thies |
| 4,273,445 A | | 6/1981 | Thompson et al. |
| 4,279,464 A | | 7/1981 | Colombini |
| 4,287,519 A | | 9/1981 | Doi |
| 4,468,084 A | | 8/1984 | Hutcheson et al. |
| 4,523,803 A | * | 6/1985 | Arao ............... G02B 6/12004 385/115 |
| 4,531,129 A | | 7/1985 | Bonebright et al. |
| 4,737,946 A | | 4/1988 | Yamashita et al. |
| 5,044,718 A | | 9/1991 | Kando |
| 5,047,776 A | | 9/1991 | Bailer |
| 5,064,263 A | * | 11/1991 | Stein ............... G01J 3/14 385/14 |
| 5,175,642 A | * | 12/1992 | Funato ............... G02B 6/12004 359/298 |
| 5,247,392 A | | 9/1993 | Plies |
| 5,274,389 A | | 12/1993 | Archer et al. |
| 5,481,516 A | | 1/1996 | Kim |
| 5,621,715 A | | 4/1997 | Ohyama |
| 5,799,118 A | * | 8/1998 | Ogusu ............... G02B 6/12007 385/14 |
| 5,835,458 A | | 11/1998 | Bischel et al. |
| 5,999,284 A | | 12/1999 | Roberts |
| 6,031,501 A | | 2/2000 | Rausch et al. |
| 6,111,674 A | | 8/2000 | Bhagavatula |
| 6,137,933 A | | 10/2000 | Hunter et al. |
| 6,160,520 A | | 12/2000 | Muhlhauser et al. |
| 6,271,970 B1 | | 8/2001 | Wade |
| 6,304,692 B1 | | 10/2001 | Sappey et al. |
| 6,553,162 B1 | | 4/2003 | Okayama |
| 6,563,977 B1 | | 5/2003 | Chen et al. |
| 7,173,767 B2 | | 2/2007 | Satzke |
| 7,184,386 B2 | | 2/2007 | Nikolai et al. |
| 7,355,162 B2 | | 4/2008 | Sidorin |
| 7,724,197 B1 | | 5/2010 | Hardie et al. |
| 7,751,658 B2 | | 7/2010 | Welch et al. |
| 8,064,744 B2 | | 11/2011 | Atkins et al. |
| 8,526,110 B1 | | 9/2013 | Honea et al. |
| 8,594,503 B2 | | 11/2013 | Roelkens et al. |
| 9,952,383 B2 | | 4/2018 | Engheta et al. |
| 10,261,389 B2 | | 4/2019 | Skirlo et al. |
| 10,345,519 B1 | | 7/2019 | Miller et al. |
| 10,649,306 B2 | | 5/2020 | Skirlo et al. |
| 2002/0085594 A1 | | 7/2002 | Pezeshki et al. |
| 2003/0002788 A1 | | 1/2003 | Bhagavatula |
| 2003/0043451 A1 | | 3/2003 | Kato et al. |
| 2004/0200650 A1 | | 10/2004 | Polak |
| 2005/0018951 A1 | | 1/2005 | Mossberg et al. |
| 2005/0117195 A1 | | 6/2005 | Glebov et al. |
| 2006/0227317 A1 | | 10/2006 | Henderson et al. |
| 2006/0291038 A1 | | 12/2006 | Matsumoto et al. |
| 2007/0223552 A1 | | 9/2007 | Muendel et al. |
| 2011/0116170 A1 | * | 5/2011 | Smith ............... G02B 3/0087 359/652 |
| 2012/0327516 A1 | | 12/2012 | Abbaspour-Tamijani |
| 2013/0108215 A1 | | 5/2013 | Ticknor et al. |
| 2013/0236193 A1 | | 9/2013 | Sengupta |
| 2014/0126905 A1 | | 5/2014 | Yonenaga et al. |
| 2015/0219308 A1 | | 8/2015 | Dross et al. |
| 2017/0062948 A1 | | 3/2017 | Artemenko et al. |
| 2017/0371227 A1 | * | 12/2017 | Skirlo ............... G02F 1/3136 |
| 2019/0265574 A1 | * | 8/2019 | Skirlo ............... G01S 7/4817 |
| 2020/0333683 A1 | * | 10/2020 | Skirlo ............... G02F 1/2955 |

FOREIGN PATENT DOCUMENTS

| | | |
|---|---|---|
| WO | 2017223299 A1 | 12/2017 |
| WO | 2018035148 A1 | 2/2018 |

OTHER PUBLICATIONS

Ashrafi-Nia, B., Yousefi, L., and Shahabadi, M., "Integrated Optical-Phased Array Nanoantenna System Using a Plasmonic Rotman Lens," Journal of Lightwave Technology, vol. 34, No. 9, May 2016, pp. 2118-2126.

Ashrafi-Nia, B., Yousefi, L., and Shahabadi, M., "Optical Beam-Steering Using a Hybrid Plasmonic Rotman Lens," 2014 Third Conference on Millimeter-Wave and Terahertz Technologies (MMWATT), Dec. 2014-Jan. 2015, 4 pages.

Borghesani, Anna, Neil Fensom, Andrew Scott, Gavin Crow, Lillianne M. Johnston, James A. King, Lesley J. Rivers, S. Cole, S. Perrin, D. Scrase, G. Bonfrate, A. Ellis, I. Lealman, "High Saturation Power (> 16.5 dBm) and Low Noise Figure ( < 6dB) Semiconductor Optical Amplifier for C-Band Operation," In Optical Fiber Communication Conference, ThO1. Optical Society of America, 2003, 3 pages.

Clark, S., C. Martin, V. Kolinko, J. Lovberg, and P. J. Costianes, "A Real-Time Wide Field of View Passive Millimeter-Wave Imaging Camera," In Applied Imagery Pattern Recognition Workshop, Proceedings. 32nd, https://ieeexplore.ieee.org, 2003, 5 pages.

Di Falco et al., "Luneburg lens in silicon photonics." Optics express 19.6 (2011): 5156-5162.

Di Falco, Andrea, Susanne C. Kehr, and Ulf Leonhardt, "Luneburg Lens in Silicon Photonics," Optics Express, vol. 19, No. 6, Mar. 2011, pp. 5156-5162.

Doylend, J. K., M. J. R. Heck, J. T. Bovington, J. D. Peters, L. A Coldren, and J.E. Bowers, "Two-Dimensional Free-Space Beam Steering with an Optical Phased Array on Silicon-on-Insulator," Optics Express, vol. 19, No. 22, Oct. 2011, pp. 21595-21604.

Engelcke, M. et al., "Vote3Deep: Fast Object Detection in 3D Point Clouds Using Efficient Convolutional Neural Networks," arXiv:1609.06666v1, Sep. 21, 2016, 7 pages.

Friedlander, F. G., "A Dielectric-Lens Aerial for Wide-Angle Beam Scanning," Electrical Engineers—Part IIIA: Radiolocation, Journal of the Institution of Electrical Engineers, vol. 93, No. 4, May 1946, pp. 658-662.

Gabrielli, Lucas H., and Michal Lipson, "Integrated Luneburg Lens via Ultra-Strong Index Gradient on Silicon," Optics Express, vol. 19, No. 21, Sep. 2011, pp. 20122-20127.

Galland, Christophe, Ran Ding, Nicholas C. Harris, Tom Baehr-Jones, and Michael Hochberg, "Broadband on-Chip Optical Non-Reciprocity Using Phase Modulators," Optics Express, vol. 21, No. 12, Optical Society of America, Jun. 2013, pp. 14500-14511.

Hall, Leonard T., Hedley J. Hansen, and Derek Abbott, "2D Scanning Rotman Lens Structure for Smart Collision Avoidance Sensors," In Microelectronics, MEMS, and Nanotechnology, International Society for Optics and Photonics, Proceedings of SPIE, vol. 5274, 2004, pp. 93-99.

Hamam, Rafif E., Mihai Ibanescu, Steven G. Johnson, J. D. Joannopoulos, and Marin Soljačić"Broadband Super-Collimation in a Hybrid Photonic Crystal Structure," Optics Express, vol. 17, No. 10, 2009, pp. 8109-8118.

(56) References Cited

OTHER PUBLICATIONS

Herd, J. S., and M. D. Conway, "The Evolution to Modern Phased Array Architectures," Proceedings of the IEEE, vol. 104, No. 3, Mar. 2016, pp. 519-529.
Herd, J. S., S. M. Duffy, and H. Steyskal, "Design Considerations and Results for an Overlapped Subarray Radar Antenna," In Aerospace Conference, 2005 IEEE, https://ieeexplore.ieee.org, 2005, 6 pages.
Hsu, Chia Wei, Bo Zhen, Jeongwon Lee, Song-Liang Chua, Steven G. Johnson, John D. Joannopoulos, and Marin Soljačić, "Observation of Trapped Light within the Radiation Continuum," Nature 499 (7457), http://nature.com, 2013, 3 pages.
Hulme, J. C. et al., "Fully integrated hybrid silicon two dimensional beam scanner," Optics Express, vol. 23, No. 5, Mar. 9, 2015, doi:10.1364/OE.23.005861, published Feb. 25, 2015, 14 pages.
Hulme, J.C., J. K. Doylend, M. J. R. Heck, J. D. Peters, M• L. Davenport, J. T. Bovington, L.A. Coldren, and J.E. Bowers, "Fully Integrated Hybrid Silicon Free-Space Beam Steering Source with 32-Channel Phased Array," In SPIE OPTO, International Society for Optics and Photonics, https://spiedigitallibrary.org,2014, pp. 898907-898907-15.
Hutchison, D. N. et al., "High-resolution aliasing-free optical beam steering," Optica, vol. 3, No. 8, Aug. 2016, pp. 887-890.
International Search Report and Written Opinion dated Sep. 1, 2017 from International Application No. PCT/US2017/038721, 14 pages.
Juodawlkis, P. W., J. J. Plant, W. Loh, L. J. Missaggia, F. J. O'Donnell, D. C. Oakley, A. Napoleone, J. Klamkin, J. Klamkin, J. T. Gopinath, D. J. Ripin, S. Gee, P. J. Delfyett, J. P. Donnelly, "High-Power, Low-Noise 1.5- μm Slab-Coupled Optical Waveguide (SCOW) Emitters: Physics, Devices, and Applications," IEEE Journal of Selected Topics in Quantum Electronics, vol. 17, No. 6, Nov./Dec. 2011, pp. 1698-1714.
Kwong, David, Amir Hosseini, John Covey, Yang Zhang, Xiaochuan Xu, Harish Subbaraman, and Ray T. Chen, "On-Chip Silicon Optical Phased Array for Two-Dimensional Beam Steering," Optics Letters, vol. 39, No. 4, Optical Society of America, Feb. 2014, pp. 941-944.
Morgan, "General solution of the Luneberg lens problem." Journal of Applied Physics 29.9 (1958): 1358-1368.
Peebles, A.L., "A Dielectric Bifocal Lens for Multibeam Antenna Applications," IEEE Transactions on Antennas and Propagation, vol. 36, No. 5, May 1988, pp. 599-606.
Poulton, C. et al., "Large-scale silicon nitride nanophotonic phased arrays at infrared and visible wavelengths," Optics Letters, Nov. 2016, Doc. ID: 275446, pp. 1-7.
Rao, J. B. L., "Multifocal Three-Dimensional Bootlace Lenses," IEEE Transactions on Antennas and Propagation, vol. AP-30, No. 6, Nov. 1982, pp. 1050-1056.
Richter, J., A. Hofmann, and L. P. Schmidt, "Dielectric Wide Angle Lenses for Millimeter-Wave Focal Plane Imaging," In Microwave Conference, 31st European, https://ieeexplore.ieee.org, 2001, 4 pages.
Ruze, J., "Wide-Angle Metal-Plate Optics," Proceedings of the IRE 38 (1), https://ieeexplore.ieee.org, Jan. 1950, pp. 53-59.
Schoenlinner, B., Xidong Wu, J. P. Ebling, G. V. Eleftheriades, and G. M. Rebeiz, "Wide-Scan Spherical-Lens Antennas for Automotive Radars," IEEE Transactions on Microwave Theory and Techniques, vol. 50, No. 9, Sep. 2002, pp. 2166-2175.
Schulwitz, L., and Amir Mortazawi, "A New Low Loss Rotman Lens Design Using a Graded Dielectric Substrate," IEEE Transactions on Microwave Theory and Techniques, vol. 56, No. 12, Dec. 2008, pp. 2734-2741.
Southall, H. L., and D. T. McGrath, "An Experimental Completely Overlapped Subarray Antenna," IEEE Transactions on Antennas and Propagation, vol. 34, No. 4, Apr. 1986, pp. 465-474.
Southwell, "Index profiles for generalized Luneburg lenses and their use in planar optical waveguides." JOSA 67.8 (1977): 1010-1014.
Takahashi et al., "Design and fabrication of dielectric nanostructured Luneburg lens in optical frequencies." 2010 International Conference on Optical MEMS and Nanophotonics. IEEE, 2010. 2 pages.
Timurdogan, Erman, Cheryl M. Sorace-Agaskar, Jie Sun, Ehsan Shah Hosseini, Aleksandr Biberman, and Michael R. Watts, "An Ultralow Power Athermal Silicon Modulator," Nature Communications 5. Nature Publishing Group, http://www.nature.com/ncomms/2014/140611/ncomms5008/full/ncomms5008.html, 2014, 11 pages.
U.S. Appl. No. 16/842,048, filed Apr. 7, 2020.
Van Acoleye, Karel, Wim Bogaerts, Jana Jagerska, Nicolas Le Thomas, Romuald Houdre, and Roel Baets, "Off-Chip Beam Steering with a One-Dimensional Optical Phased Array on Silicon-on-Insulator," Optics Letters, vol. 34, No. 9, Optical Society of America, May 2009, pp. 1477-1479.
Xie, Yiyuan, Jiang Xu, and Jianguo Zhang, "Elimination of Cross-Talk in Silicon-on-Insulator Waveguide Crossings with Optimized Angle," Optical Engineering 50(6), International Society for Optics and Photonics, Jun. 2011, pp. 064601-064601-4.
Yaacobi, Ami, Jie Sun, Michele Moresco, Gerald Leake, Douglas Coolbaugh, and Michael R. Watts, "Integrated Phased Array for Wide-Angle Beam Steering," Optics Letters, vol. 39, No. 15, Aug. 2014, pp. 4575-4578.
Zhang, Chong, Sudharsanan Srinivasan, Yongbo Tang, Martijn J. R. Heck, Michael L. Davenport, and John E. Bowers, "Low Threshold and High Speed Short Cavity Distributed Feedback Hybrid Silicon Lasers," Optics Express, vol. 22, No. 9, 2014, pp. 10202-10209.
Zhen, Bo, Chia Wei Hsu, Ling Lu, A. Douglas Stone, and Marin Soljačić, "Topological Nature of Optical Bound States in the Continuum," Physical Review Letters, 113(25), Dec. 2014, pp. 257401-1-257401-5.
International Search Report and Written Opinion in International Patent Application No. PCT/US2020/020393 dated Jun. 4, 2020, 9 pages.
Kim, "Design of a photonic crystal planar Luneburg lens for optical beam steering." Diss. Massachusetts Institute of Technology, 2019. 60 pages.

* cited by examiner

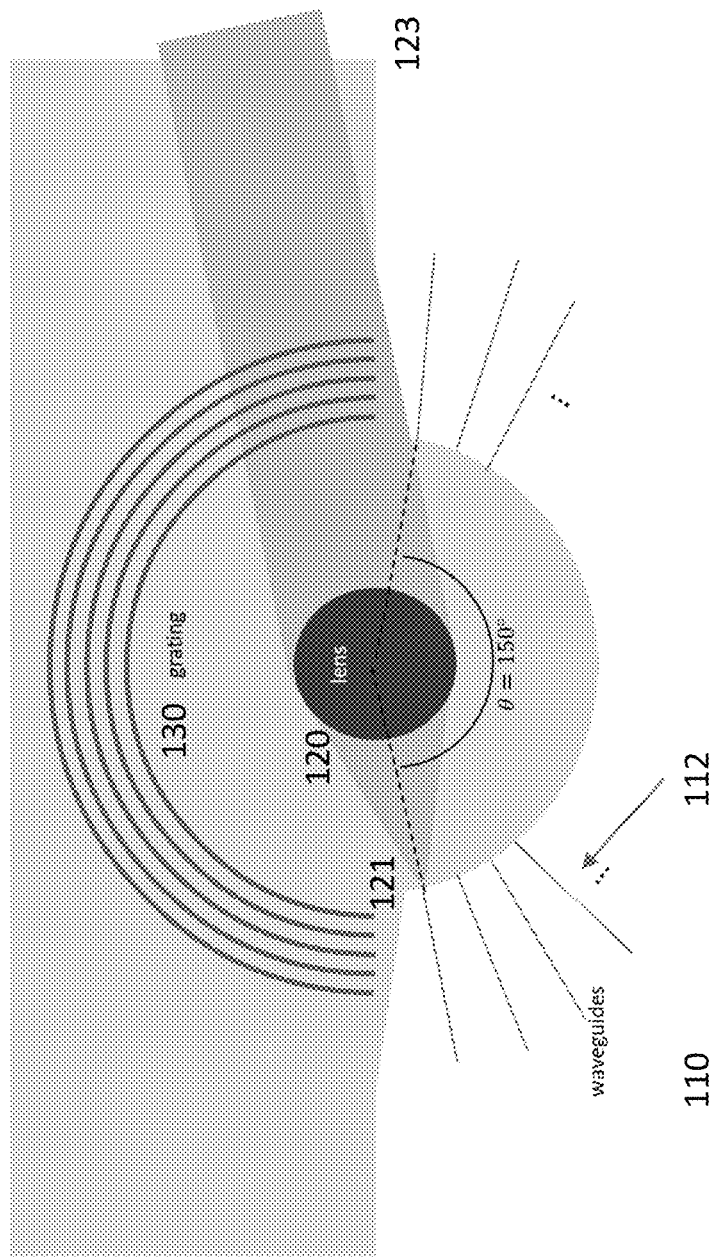

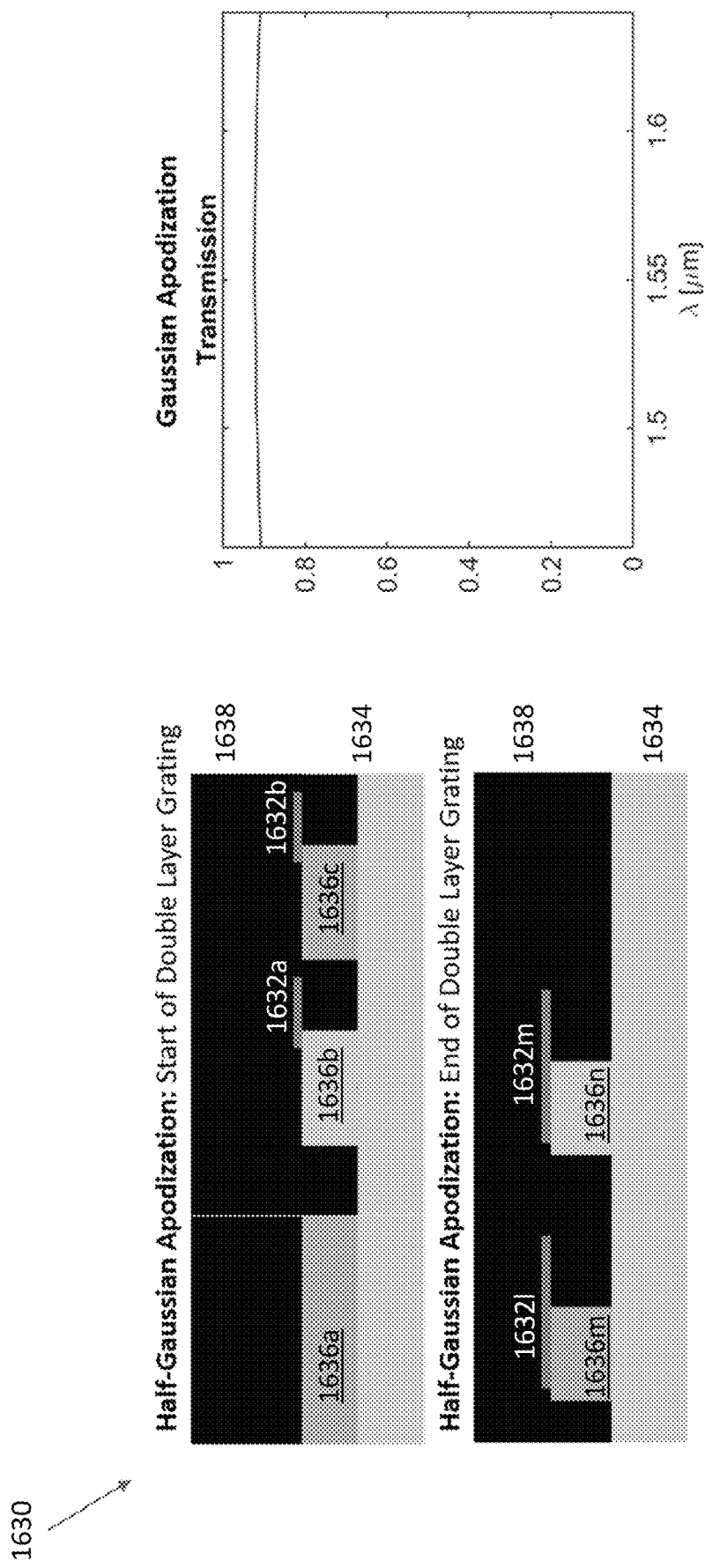

PLANAR LUNEBURG LENS SYSTEM FOR TWO-DIMENSIONAL OPTICAL BEAM STEERING

CROSS-REFERENCE TO RELATED APPLICATION(S)

This application claims the priority benefit, under 35 U.S.C. § 119(e), of U.S. Application No. 62/840,468, filed Apr. 30, 2019, which is incorporated herein by reference in its entirety.

GOVERNMENT SUPPORT

This invention was made with Government support under Grant No. FA8702-15-D-0001 awarded by the U.S. Air Force. The Government has certain rights in the invention.

BACKGROUND

Solid-state optical beam steering solutions enable light detection and ranging (LIDAR) capabilities for autonomous vehicles and systems. There is an ongoing search for beam steering solutions that enable a wide-field-of-view and are low in power consumption, weight, and device footprint.

The rise of autonomous navigation for self-driving cars and drones has propelled interest in LIDAR. One of the application spaces that has yet to be filled, but is of great interest, is a non-mechanically steered LIDAR sensor which has substantial range (e.g., 100-300 m), low power (e.g., 1-10 W), low cost (e.g., hundreds of dollars), high resolution (e.g., $10^4$ to $10^6$ pixels) and small size (e.g., 10 cm$^3$). There are several candidate technologies including micro-mechanical mirrors, liquid-crystal based devices, and integrated photonics that are currently being explored academically and commercially to fill this niche.

Current state-of-the-art chip-scale integrated-photonic LIDARs are based on 1D or 2D optical phased array antennas. In this type of architecture, a 1D or 2D array of dielectric grating antennas is connected to electrically-controlled thermo-optic or electro-optic phase shifters. These phase shifters are fed by waveguides splitting off from one main dielectric waveguide which brings power from an off-chip or on-chip source. By applying a gradient to the phases tuning each antenna, the beam emitted can be steered in and/or out of the plane of the phased array.

The direct predecessors of this architecture are radio frequency (RF) phased arrays developed for military and commercial RADARs. Although the detailed implementation is different because RF relies primarily on metallic waveguides and structures whereas integrated photonics uses dielectrics, optical phased arrays are based on replacing RF components with their optical equivalents. This direct translation brings a significant disadvantage: whereas metallic waveguides can be spaced at sub-wavelength pitches, eliminating parasitic grating lobes, dielectric waveguides are usually separated by several wavelengths to prevent excessive coupling, resulting in significant grating lobes.

RF phased array radars are routinely produced with closely spaced antennas (e.g., <$\lambda/2$ apart) in subarrays that can be tiled to create very large apertures. This provides wide-angle steering and scaling to large power-aperture designs. Fundamentally, the radiating elements can be closely spaced with independent control circuitry because the amplifiers, phase shifters and switches in the RF are implemented as subwavelength lumped elements.

Current chip-scale optical phased arrays often reproduce RF phased array architectures, with RF elements replaced with their optical analogs. Fundamentally, the optical analogs to RF components are traveling-wave designs that are multiple wavelengths long and spaced apart by more than $\lambda/2$. This design allows beam-steering over angles of more than 50°, but with less power in the main lobe due to the presence of side lobes. In an end-fed geometry, for example, the grating antenna elements can be closely spaced for wide-angle azimuthal steering and use wavelength tuning to change the out-coupling angle of the gratings for elevation steering. But this end-fed geometry cannot be tiled without introducing significant grating lobes due to the sparsity of the antenna elements.

SUMMARY

An on-chip Luneburg lens optical beam steering system with subwavelength features provides a wide-field-of-view for applications in LIDAR with low power consumption, weight, and device footprint. The Luneburg lens is composed of a lattice of subwavelength elements (examples are holes, posts, crosses, pixelated features, and combinations thereof) that yield a gradient index of refraction. This gradient index of refraction controls the phase of light propagating within the plane of the lens and results in a collimated beam in the plane of the same device. This may be circularly symmetric and can receive light from any angle in the plane of the lens. The lens can contain nanostructures with periodicities in either the photonic crystal (approximately $\lambda/2$) or metamaterial (approximately $\lambda/10$) regime, where $\lambda$ is the wavelength of operation inside the material (with an effective refractive index $n_{material}$, which may be the effective index of the two-dimensional slab rather than the refractive index of bulk SiN). The difference between the photonic crystal and metamaterial regimes is fluid (the periodicity can be seen as a spectrum) and is generally taken to be about $\lambda/10$ to $\lambda$ for the photonic crystal regime and less than $\lambda/10$ for the metamaterial regime. The features themselves can have dimensions on the order of $\lambda/10$, $\lambda/100$, or smaller in both the photonic crystal and metamaterial regimes.

Optical beam steering with a Luneburg lens allows for operation (i) from any input waveguide direction due to the radial symmetry of the lens and (ii) within the visible and infrared regime. One version of a Luneburg lens is composed of holes, crosses, or pixelated features arranged in a hexagonal crystal lattice with periodicity in the photonic crystal regime (approx. $\lambda/2$). The system is built using a silicon nitride (SiN) slab waveguide and a high refractive index material layer, such as amorphous silicon (a-Si) or germanium, that is encapsulated by a silicon dioxide (SiO$_2$) cladding. An optical signal is routed on-chip to either a Mach-Zehnder interferometer tree or power splitter that has a total of N waveguides and, thus, N optical ports at the interface between the waveguides and the slab containing the lens. The number of ports can range from but is not limited to N=4 to N=2048, which can yield in an equal number of beams in and out of the plane of the lens. These waveguides/inputs feed directly into a slab waveguide that contains the (planar) Luneburg lens.

The Luneburg lens collimates the incoming light, which is then fed into a curved grating to couple the light out in the polar direction. The lens and the grating are manufactured from a stack of a bottom waveguide slab, such as a SiN slab, and a-Si or another high refractive index material that is compatible with semiconductor fabrication, including but not limited to silicon, polysilicon, germanium, or gallium arsenide. The grating can have a multi-layer stack configuration to increase or maximize emission from one side of the device (top) or a grating with weak perturbations to increase the size of the aperture and obtain the lowest optical beam divergence from the output of the device.

Full-wave electromagnetic simulations demonstrate a lens with a 60 μm radius can achieve a 3-dB far-field beam-width of 0.5° and a field-of-view (FOV) of over 160°. The performance improves as the lens is scaled up to larger radiuses. In particular, the FOV remains constant and the beam divergence decreases as the lens radius increases (e.g., a lens radius of 120 μm yields a 0.25-degree beam divergence angle). The lens can be designed within semiconductor fabrication capabilities using either optical, electron beam, and/or related lithography techniques.

Unlike other optical beam steering devices, a planar Luneburg optical beam steering system enables the emission of an optical beam in a radially symmetric way (360 degrees) in the plane of the lens. Because the Luneburg lens is radially symmetric, it can focus light over a 360-degree FOV. This is in contrast to an aplanatic lens, which suffers from more traditional limits on numerical aperture. The Luneburg lens's practical FOV is 180 degrees when fed with a network of waveguides. Furthermore, the addition of a circularly symmetric grating allows coupling out-of-the-plane of the device with fewer effects on the far-field beam quality than with a straight grating.

The Luneburg lens designed herein contains nanoscale photonic structures which allow for a change in refractive index. It takes a source from input waveguides in-the-plane of the lens and does optical wave front shaping (via refractive index gradients) and collimates the source into a beam with approximately the same diameter as the lens. The beam is steered in the azimuthal direction via the choice of the input port. Subsequently the collimated beam is directed out-of-the-plane of the lens in the polar direction via a (circular) grating, which allows for symmetric beam steering over an extremely wide field of view (e.g., 100°, 110°, 120°, 130°, 140°, 150°, 160°, 170°, or 180°).

An example optical beam steering lens may include a planar Luneburg lens formed on a substrate in optical communication with the waveguide array and a curved grating. In operation, the planar Luneburg lens collimates light emitted by a first waveguide in the waveguide array as a first collimated beam propagating in a first direction in a plane of the substrate. It also collimates light emitted by a second waveguide in the waveguide array as a second collimated beam propagating in a second direction in the plane of the substrate different than the first direction. It may collimate the light by the first and second waveguides at the same time. In any case, the curved grating couples at least a portion of the first collimated beam and the second collimated beam out of the plane of the substrate.

The waveguide array's outputs can be disposed on a circle concentric with the planar Luneburg lens and the curved grating. In this case, the planar Luneburg lens may have a focal length equal to the radius of curvature of the circle.

The planar Luneburg lens can have a field of view of at least 100°. It can comprise a dielectric material patterned with holes having radii smaller than a wavelength of the light. These holes can be spaced at a pitch smaller than the wavelength of the light. The radii of the holes can vary with distance from the center of the planar Luneburg lens. For example, the planar Luneburg lens can comprise amorphous silicon deposited on a layer of silicon nitride. The amorphous silicon can be patterned with holes having radii ranging from about 50 nm to about 150 nm on a hexagonal lattice with a pitch ranging from about 300 nm to about 500 nm.

The curved grating can have a ruling that is a distance d from the Luneburg lens and an inner radius of curvature R selected such that d/R is equal to or greater than 0.99. The curved grating can have a grating fill factor that varies with distance from the Luneburg lens. The curved grating may include a first grating layer disposed on and shifted with respect to a second grating layer. In operation, the first and second collimated beams may illuminate first and second approximately linear sections of the curved grating with the first collimated beam and illuminating a second approximately linear section of the semi-circular grating with the second collimated beam.

The optical beam steering apparatus may also include a tunable light source in optical communication with the waveguide array. This tunable light source can tune a wavelength of the light emitted by the first waveguide and the light emitted by the second waveguide. In addition, there may be a network of optical switches formed on the substrate in optical communication with the tunable light source and the waveguide array. These switches can guide the light emitted by the first waveguide from the tunable light source to the first waveguide when in a first state and to guide the light emitted by the second waveguide from the tunable light source to the second waveguide when in a second state.

The optical beam steering apparatus can include a slab waveguide formed on the substrate in optical communication with the waveguide array and the planar Luneburg lens. This slab waveguide can guide the light from the first waveguide and the light from the second waveguide to the planar Luneburg lens.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 1A-1C show top views of an optical beam steering system with input waveguides, a Luneburg lens, and a grating formed in a planar substrate.

FIG. 16A shows cross-sections of the ends of a half-Gaussian apodized, double-layer grating with a top layer offset showing that the top (a-Si) grating is increasing in fill-fraction and the bottom (SiN) grating is decreasing in fill-fraction.

FIG. 16B shows the transmission of the half-Gaussian apodized, double-layer grating, with constructive interference in the upward direction producing an average upward transmission equal to 90 percent.

DETAILED DESCRIPTION

An optical beam-steering system with a planar Luneburg lens has several advantages over other optical beam-steering systems. To start, because the Luneburg lens has a 360-degree field of view (FOV), it can be fed from optical waveguides in an optical beam steering system over a 180-degree FOV, which is much greater than other systems. In addition, the system's beam quality is uniform over the entire FOV, unlike with aplanatic lenses, which suffer from performance degradation when illuminated off-axis.

In addition, an optical beam steering system with a planar Luneburg lens can be fabricated using CMOS compatible materials, such as silicon, silicon dioxide, and silicon nitride, with the materials setting the index contrast for the lens. The planar Luneburg lens can be formed by engineering the effective refractive index profile of the beam-steering chip with silicon dioxide cylinders in holes in amorphous silicon on silicon nitride. The holes' radii can be selected to vary the refractive index profile as a function of distance from the lens center, thereby creating a planar Luneburg lens whose focal length equals the distance from the lens center to the waveguides that feed the lens. The refractive index at the edge of the planar Luneburg lens may be greater than the refractive index of the surrounding medium to prevent the index contrast from vanishing at the edge of the lens. The planar Luneburg lens's radius and focal length may be selected so that the diverging beams emitted by the waveguides fill the lens.

A semi-circular grating diffracts the beams collimated by the planar Luneburg lens out of the plane of the planar Luneburg lens. The grating is concentric with the planar Luneburg lens, so the grating periods experienced by the collimated beams are the same regardless of the grating angle, giving the beam-steering system a cylindrical FOV (i.e., a rectangular FOV in polar coordinates). In the far-field, the steered beams are circularly symmetric, which eases processing and improves performance for lidar.

The waveguides that feed the planar Luneburg lens have outputs placed at normal incidence (tangent) on a 180-degree arc whose radius is the lens focal length and whose center is lens center. Because the planar Luneburg lens is circularly symmetric, it can tolerate misalignment of output waveguides. Circular symmetry makes optimization of the waveguides, lens, and grating easier for the size of the aperture and beam quality characteristics, such as beam divergence. In addition, circular symmetry means that the same optimum is optimal for all input angles, as opposed to a more traditional (aplanatic) lens where what is optimal for one angle might not be optimal for another angle.

An Optical Beam-Steering System with a Planar Luneburg Lens

Figure 1B:
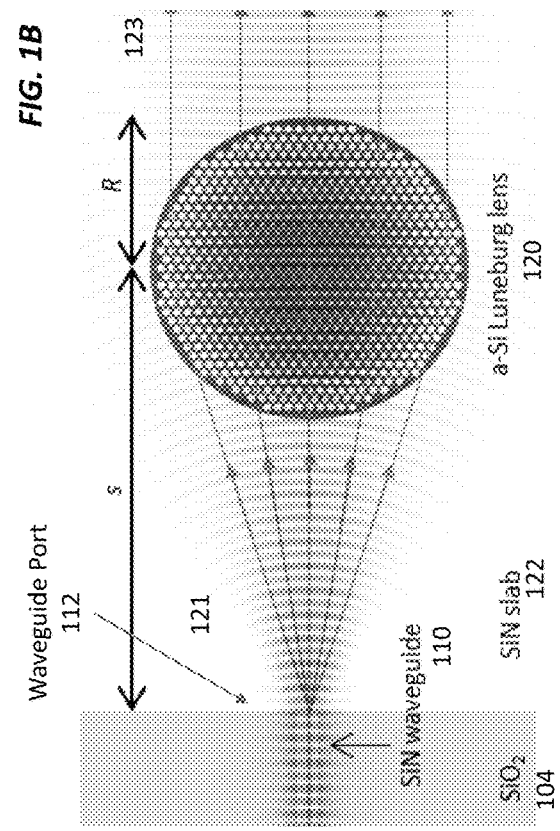
Figure 1A:
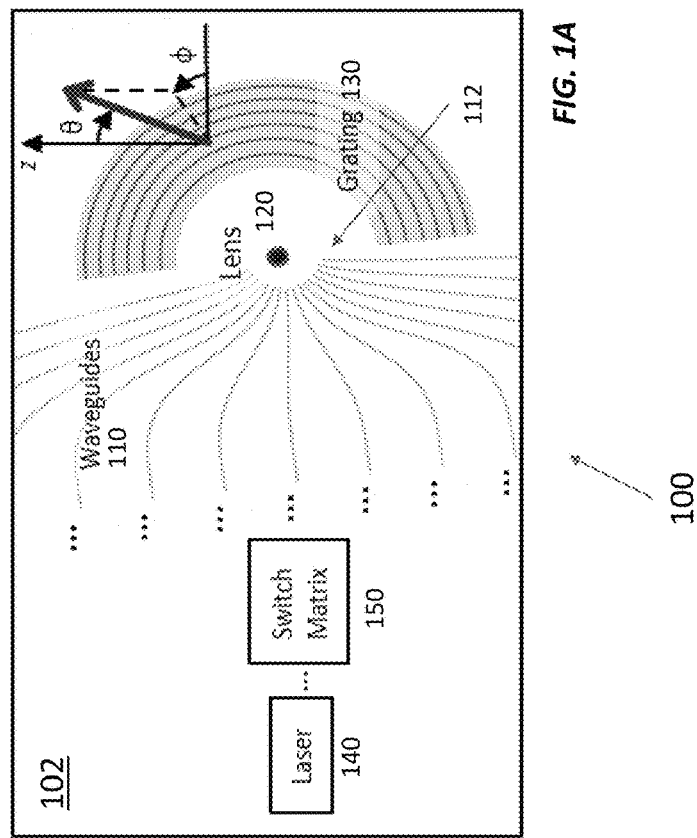

FIGS. 1A-1C show an optical beam-steering chip 100 with a planar Luneburg lens 120 and curved (here, semi-circular) grating 130. The chip 100 includes an array of waveguides 110 that are fed by a switch matrix 150, which can be implemented as a network of reconfigurable beam splitters and is coupled to a laser 140, which can be integrated on the chip 100 (as shown in FIG. 1A) or coupled to the chip 100. The waveguides 110 can also be fed by a splitter tree instead of by the switch matrix 150. The lens can be included with other optical components on the same substrate to build more complex photonic integrated circuits and/or hybrid systems.

The waveguides 110 and switch matrix 150 are formed in a semiconductor, dielectric, or similar material on a semiconductor or dielectric substrate 102 and emit light from ports 112 arranged on a circle concentric with the center of the planar Luneburg lens 120. The radius of this circle is equal to the focal length of the Luneburg lens 120 (the lens 120 is designed to account for the refractive index of the surrounding medium such that the focal length is the radius of the circle). The semi-circular grating 130 is concentric with the Luneburg lens 120 and on the opposite side of the Luneburg lens 120 from the waveguide ports 112. The waveguides 110, Luneburg lens 120, and grating 130 may all be formed in the same layer(s) on the same substrate 102.

FIG. 1B shows a closeup of a single SiN waveguide 100 that is clad in $SiO_2$ 104 emits a diverging beam 121 from a waveguide port 112 toward the Luneburg lens 120, which has a radius R and a focal length s. The Luneburg lens 120 is formed of patterned a-Si layer in a SiN slab waveguide 122, which guides the diverging beam 121 to the Luneburg lens 120. The Luneburg lens 120 collimates the incident diverging beam 121 to emit a collimated beam 123 propagating away from the waveguide 110.

FIG. 1C illustrates how the optical beam-steering chip 100 shown in FIGS. 1A and 1B can steer light in different directions (in the plane of the chip 100). Each waveguide port 112 acts as a point source that emits a corresponding diverging beam 121 towards the Luneburg lens 120. In FIG. 1C, the leftmost waveguide port 112 emits a diverging beam 121 that the Luneburg lens 120 collimates as a collimated beam 123. The semi-circular grating 130 diffracts the collimated beam 123 out of the plane of the optical beam-steering chip 100 at an angle determined by the beam's wavelength. The collimated beam can be steered in the plane of the chip 100 (the azimuthal direction) by switching the waveguide port 121 with the switch matrix 150 (FIG. 1A). The Luneburg lens 120 and grating 130 can collimate and diffract more than beam at a time, so it is possible to emit beams from multiple waveguides 100 simultaneously.

The collimated beam 123 is steered in a plane perpendicular to the chip 100 (the polar direction) by tuning the beam's wavelength. The beam may be generated by a tunable infrared (IR) light source, such as the on-chip laser 140 shown in FIG. 1A or an off-chip laser source fiber-coupled to the chip 100. The beam's wavelength may be centered at $\lambda_0 = 1.55$ μm and tuned over a total wavelength range of 100 nm. Other center wavelengths and bandwidths are also possible—the grating 130 can operate over a larger bandwidth than 100 nm and be centered around a wavelength $\lambda_0$ other than 1550 nm, so the system bandwidth depends largely on the bandwidth of the source (laser 140). In this example, the signal is TE polarized (E-field is in plane, H-field is out of plane). The TE polarization ensures higher confinement in the Luneburg lens 120 and the SiN slab waveguide 122 that contains the Luneburg lens 120. An equivalent architecture may operate on a TM polarized field.

The grating 130, Luneburg lens 120, and waveguides 110 can also be used to receive light in addition to or instead of transmitting light. When the chip 100 is used as a receiver, the grating 130 couples light from a particular angle into the chip 100, and the Luneburg lens 120 couples the light from the grating 130 into a corresponding waveguide 110. A detector or detector array (not shown) at the far end of the waveguide 110 detects the received beam. The detector(s) can be coherent or incoherent and may take the form of an integrated waveguide photodector (such as a germanium photodiode or InP photodiode), focal plane array (FPA), linear-mode avalanche photodiodes (APDs), Geiger-mode APDs (e.g., made of InGaAs, HgCdTe, CdZnTe, or any other suitable material), or other suitable detector. If desired, a lidar or other system may include two optical beam-steering chips: one for steering beams that illuminate a scene and another for receiving light scattered or reflected by objects in the scene (the returns).

Compared to other integrated optical beam-steering systems, the optical beam-steering system 100 shown in FIGS. 1A-1C operates over a significantly wider field of view—e.g., 140°, 150°, 160°, 170°, and possibly even 180°—in a smaller footprint thanks to the circular symmetry of the Luneburg lens 120. This means that, unlike an aplanatic lens, a Luneburg lens 120 can focus beams incident at both normal incidence and at 90-degree incidence.

In addition, the optical beam-steering system 100 in FIGS. 1A-1C operates uniformly over its entire field of view. That is, a beam emitted at the edge of the chip's field of view has the same parameters as a beam emitted on boresight (at the center of the chip's field of view). These parameters include but are not limited to beam width, beam shape, divergence angle, sidelobe levels, and power efficiency. This uniformity over such a wide field of view gives an inventive optical beam-steering system 100 excellent beam-steering performance in a small, light package. The face of the Luneburg lens 120 may also reflect less light than other lenses due to its gradient-index profile, leading to higher light throughput.

If desired, many beam-steering chips 100 can be tiled together to create a larger beam-steering system. If the chips 100 are implemented with 2D photonic crystal gratings, the chips 100 may be tiled so that the boundaries between adjacent 2D photonic crystals are seamless, allowing higher optical throughput. This seamless tiling allows for a larger aperture with improved far-field beam shape and smaller beam divergences.

Luneburg Lenses

Figure 2:
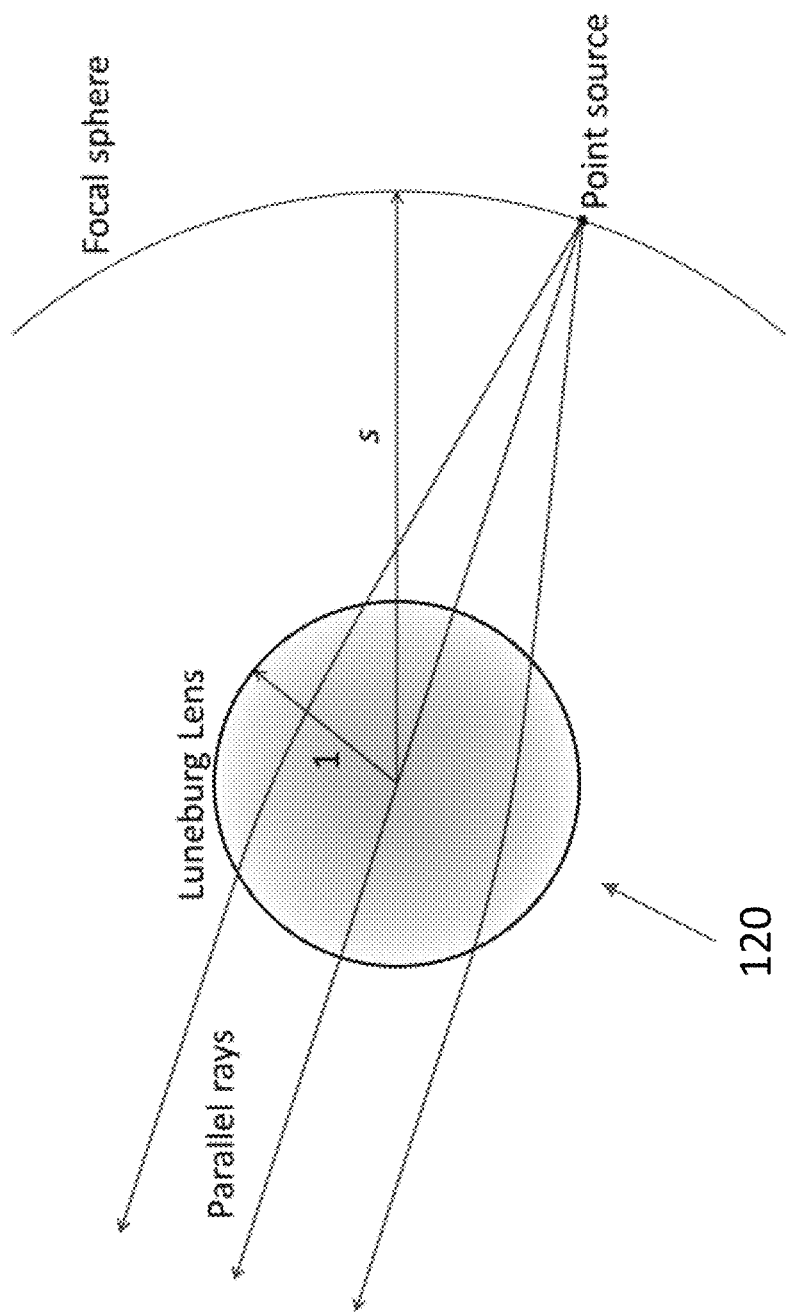
FIG. 2 shows a generalized Luneburg lens.

FIG. 2 shows a generalized version of a Luneburg lens 200, which is a spherically (3D) or circularly (2D) symmetric lens that focuses parallel rays coming in from any direction (i.e., the lens's focal point is at infinity) onto a point on a concentric circle with radius s>R, where R is the outer radius of the lens. The lens is a gradient index lens with index of refraction n(r) as a function of radius r. The maximum radius r (i.e., outer radius R) can range from 2 μm to 100 μm or more (e.g., 4 μm, 6 μm, 10 μm, 15 μm, 20 μm, 30 μm, 40 μm, or 50 μm). The radius s of the concentric circle (i.e., the distance between the lens and the waveguides) is about one to three times the lens radius R, or about 2 μm to 300 μm or more (e.g., 12 μm, 18 μm, 30 μm, 45 μm, 60 μm, 90 μm, 120 μm, or 150 μm).

The index profile of a Luneburg lens can be solved via the parametric equations:

$$n = \frac{1}{a}\exp[\omega(\rho, r_0) + \omega(\rho, r_1) - \Omega(\rho)]$$

$$r = \frac{\rho}{n}$$

$$\omega(\rho, s) = \frac{1}{\pi}\int_\rho^1 \frac{\sin^{-1}\left(\frac{\kappa}{s}\right)}{(\kappa^2 - \rho^2)^{\frac{1}{2}}} d\kappa$$

$$\Omega(\rho) = \frac{2}{m}[\omega(\rho, an_a^+) - \omega(\rho, n_1)]$$

In these equations, the radius r is normalized to the outer radius R of the lens so that 0≤r≤1, as shown in FIG. 2, and the refractive index n is normalized to the refractive index of the surrounding medium (e.g., air, which has a refractive index of 1, or silicon nitride, which has a refractive index of about 2.0 at visible and infrared wavelengths). The constant a represents the transition point in the lens, described below. The expression for ω(ρ, s) can be rewritten for easier numerical evaluation:

$$\omega(\rho, s) = \frac{1}{\pi}\left\{2\sin^{-1}\left(\frac{1}{s}\right)\sqrt{\frac{1-\rho}{1+\rho}} - \int_0^\rho \left[\frac{2}{\sqrt{s^2 - (y+\rho)^2}} - \frac{\sin^{-1}\left[\frac{y+\rho}{s}\right]}{y+2\rho}\right]\sqrt{\frac{y}{y+2\rho}} dy\right\}$$

Given the location of the Luneburg lens's conjugate focal points (which in this case are at infinity and at s), there are multiple solutions for the Luneburg lens's index profile. One solution is to have the index of the Luneburg lens at the edge equal to that of the surrounding medium, n(1)=1. In this case, a=1. FIG. 3A shows solutions to the equations for the refractive index profiles of Luneburg lenses as a function of radius r with different values of s. Because the solutions are not unique, they can be selected to fit fabrication limits and to be robust to fabrication variation.

Figure 3B:
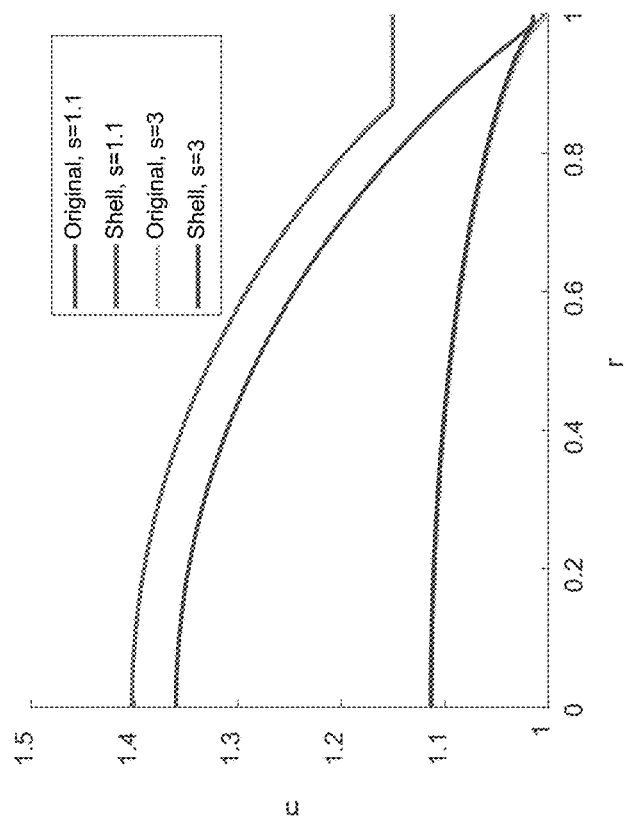
FIG. 3B shows a comparison of Luneburg lens profiles with a homogeneous outer shell.
Figure 3A:
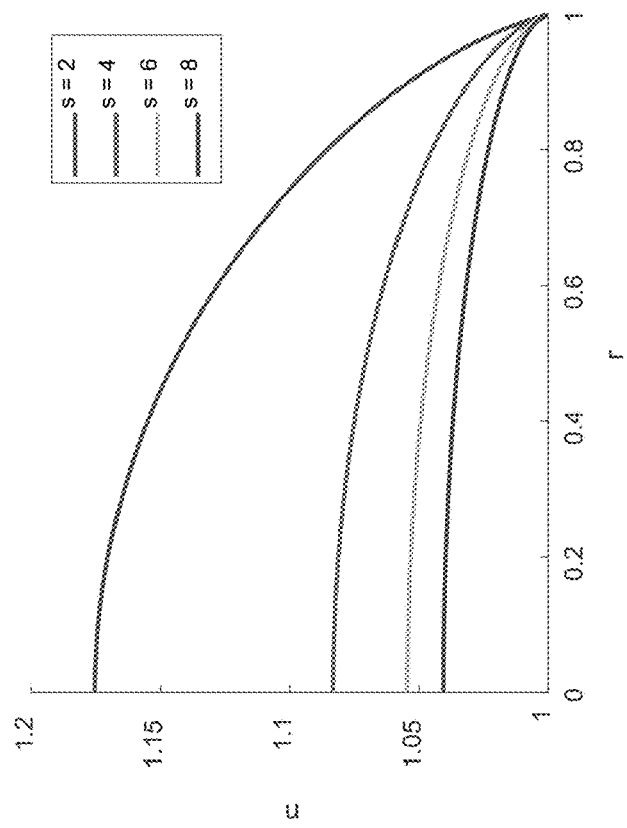
FIG. 3A shows Luneburg lens index profiles for various normalized lens focal lengths, s, where the refractive index of the Luneburg lens at the edge equals the refractive index of the surrounding medium.

FIG. 3B shows solutions for the refractive index profile of a Luneburg lens with an outer shell with constant index, such that in the region a≤r≤1, n(r)=1/a. This homogeneous shell solution raises the index at the center of the Luneburg lens, but also decreases the range of variation of refractive index n in the Luneburg lens. This can be advantageous when making a Luneburg lens out of metamaterials that cannot reach the entire range of effective indices down to n=1 due to the metamaterials' minimum feature size(s).

Photonic Crystal and Metamaterial Planar Luneburg Lenses

A Luneburg lens can be made of a photonic crystal or metamaterial patterned in a semiconductor or dielectric substrate to provide the desired refractive index profile. Photonic-crystal Luneburg lenses typically have features with lateral dimensions (widths or diameters) of λ/2 or larger, where λ is the Luneburg lens's operating wavelength, whereas metamaterial Luneburg lenses typically have features sizes of λ/10 or smaller. These features can be holes, crosses, or pixelated features to speed lithography mask production. Both photonic crystal and metamaterial Luneburg lenses can be made out of amorphous silicon (a-Si), silicon nitride (SiN), and/or other materials using standard deposition and patterning techniques.

In a photonic-crystal Luneburg lens, the photonic crystal can include a layer of a-Si on top of a bottom layer of SiN. The a-Si layer can contain a lattice of holes filled with $SiO_2$ cladding. The lattice can be hexagonal, rectangular, concentric rings, aperiodic, or randomized. In the case of a hexagonal lattice, the lattice spacing can be 300 nm to 400 nm, and the hole diameters can range from 100 nm to 300 nm. The hole size at each point in the lens is chosen to achieve a desired effective index of refraction. The lattice spacing and hole size may be larger for longer (infrared) wavelengths or shorter (visible) wavelengths.

The SiN layer may have a thickness of 200 nm. This thickness allows for the first Transverse Electromagnetic (TE) mode to be used, but other thicknesses and corresponding modes are also possible. The a-Si layer on top of the SiN layer can have a thickness of 20-40 nm. This a-Si layer could be thicker or thinner, depending in part on the geometries and compositions of the adjacent layers.

In a metamaterial Luneburg lens, the primary feature size (e.g., post diameter) and the smallest gap (e.g., hole diameter) of the a-Si layer can be set to be 100 nm. The lens can be designed to have nanoscale features less than λ/10 in lateral dimension (the metamaterial regime), or about 20-50 nm in width/diameter. The Luneburg lens's feature size does not necessarily correspond to its operating wavelength because a metamaterial has a feature size that is <λ/10. The smaller features here allow the Luneburg lens to act as a metamaterial that "looks uniform" to near-infrared light (e.g., light at a wavelength of 1500 nm to 1600 nm).

Figure 4:
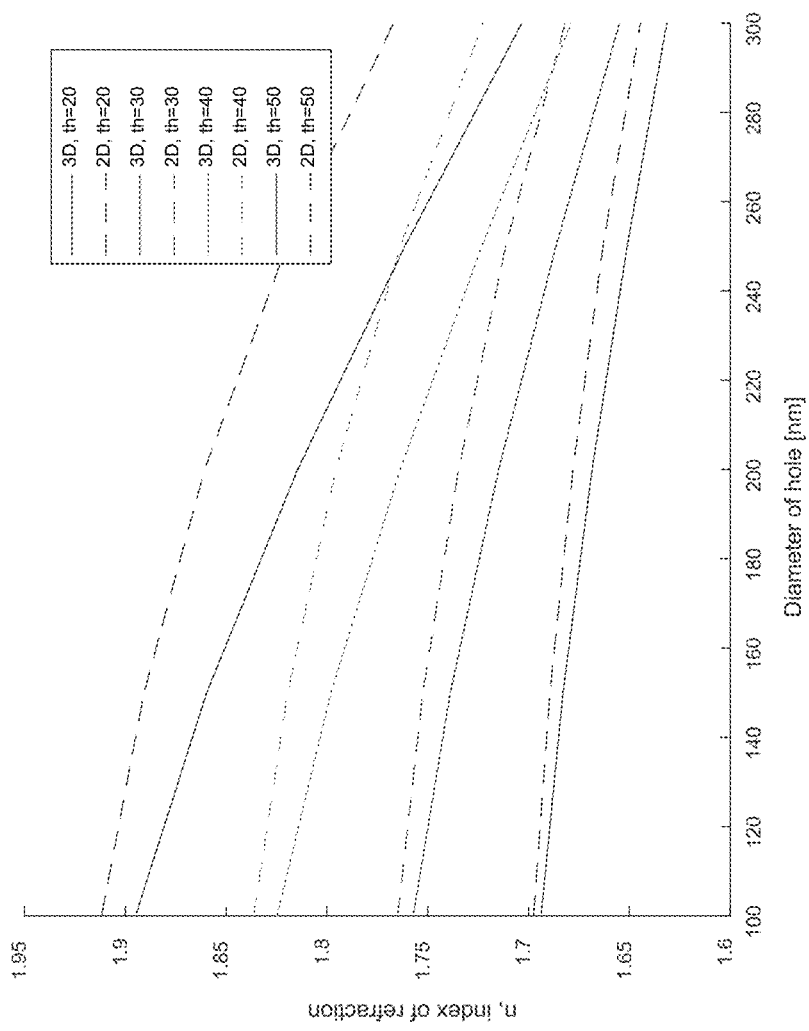
FIG. 4 is a plot of the effective index for 2D and 3D Luneburg lenses made of hexagonal lattice of a-Si holes in silicon nitride with a period a=400 nm and hole diameters ranging from 20 nm to 50 nm.

FIG. 4 is a plot of the calculated effective index for a photonic crystal unit cell using two-dimensional (2D) and three-dimensional (3D) simulations. Each Luneburg lens is made of a hexagonal lattice of a-Si holes in silicon nitride with a period a=400 nm. The hole diameters range from 20 nm to 50 nm. Increasing the hole diameter increases both the effective refractive index at the center of the Luneburg lens and the slope of the refractive index with radius.

Photonic-Crystal Luneburg Lens Simulations

Figure 5C:
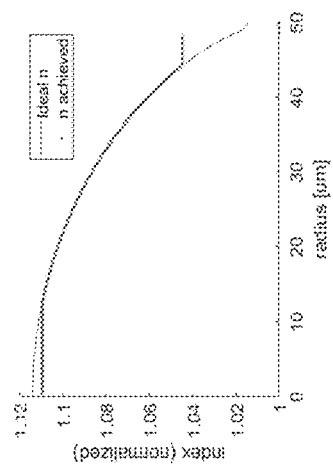
FIG. 5C shows the ideal and achieved effective indices of refraction versus lens radius in the photonic crystal Luneburg lens of FIG. 5A.
Figure 5B:
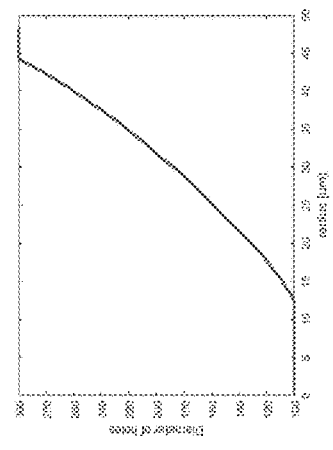
FIG. 5B shows the hole diameter versus lens radius in the photonic crystal Luneburg lens of FIG. 5A.
Figure 5A:
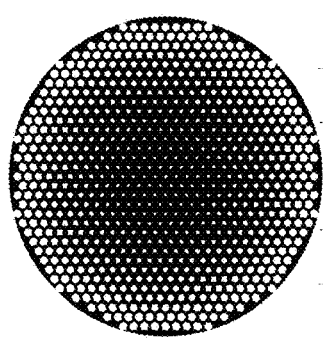
FIG. 5A shows a photonic crystal Luneburg lens where black represents a-Si and white represents holes filled with $SiO_2$.

FIGS. 5A-5C shows an example of a photonic-crystal Luneburg lens suitable for using in an optical beam-steering system. FIG. 5A shows the lens itself, with black for a-Si and white for $SiO_2$ cylinders that fill in holes formed in the a-Si.

The hole diameter ranges from about 100 nm toward the center of the lens to about 300 nm at the outer edge of the lens as shown in FIG. 5B, which is a plot of hole/SiO$_2$ cylinder diameter as a function of lens radius. The hole diameter is truncated because of fabrication constraints.

FIG. 5C shows the calculated effective index profile of the photonic-crystal lens of FIG. 5A. The index profile was calculated by simulating the photonic crystal unit cell using a software package for computing the band structures, dispersion relations, and electromagnetic modes of periodic dielectric structures. Using a root finder, the wavenumber k corresponding to a particular frequency can be determined. The operating frequency is determined by the range of the laser source. (The wavelength range for a standard C and L band laser source is between 1.46 µm to 1.64 µm.) The wavenumber was then used to find the effective index for the unit cell.

The achieved index of refraction in FIG. 5B is truncated due to optical lithography fabrication limits. There is no a-Si in regions where the desired index of refraction is close to 1. Reflections at the outer edge of the Luneburg lens can be mitigated by engineering a gradient of index that matches the surrounding medium and the calculated index of refraction at the outer edge.

Figure 6C:
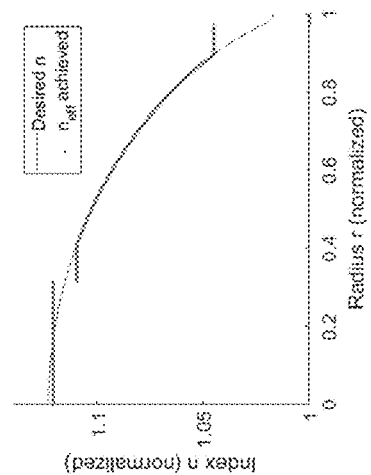
FIG. 6C shows the ideal and achieved effective indices of refraction versus lens radius in the photonic crystal Luneburg lens of FIG. 6A.
Figure 6B:
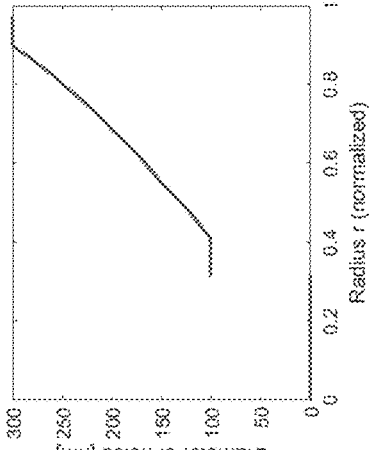
FIG. 6B shows the hole diameter versus lens radius in the photonic crystal Luneburg lens of FIG. 6A.
Figure 6A:
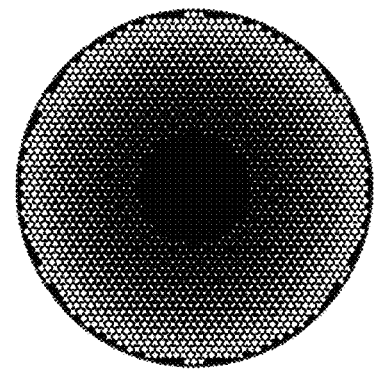
FIG. 6A shows a photonic crystal Luneburg lens with an a-Si center (black) surrounded by holes (white).

FIGS. 6A-6C illustrate a Luneburg lens with a different distribution of holes/SiO$_2$ cylinders in an a-Si layer on a SiN substrate. FIG. 6A shows the lens itself. FIG. 6B shows the hole/SiO$_2$ cylinder diameter as a function of lens radius. There are no holes or SiO$_2$ cylinders at the center of the lens (≤0.3r). The hole diameter is constant at 100 nm from about 0.3r to about 0.35r, then increases monotonically to 300 nm at about 0.9r, where the hold diameter levels off. This produces an effective index of refraction profile with discontinuities at 0.35r and 0.9r as shown in FIG. 6C.

FIGS. 7A-7D illustrate full-wave electromagnetic finite-difference time-domain (FDTD) simulations of SiN waveguides feeding into a SiN slab and a photonic-crystal Luneburg lens and the resulting H-field and far-field of the simulation. The 2D simulations used perfectly matched layers at all boundaries with a thickness of 1 µm. The resolution was defined as number of mesh cells per unit distance (1 µm) set to 30 or 40 for 2D simulations.

Figure 7B:
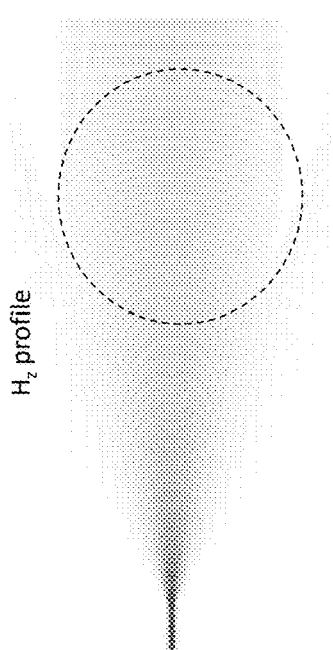
FIG. 7B shows a simulated magnetic field of the device in FIG. 7A after convergence; light coming in from the waveguide is collimated by the Luneburg lens.
Figure 7D:
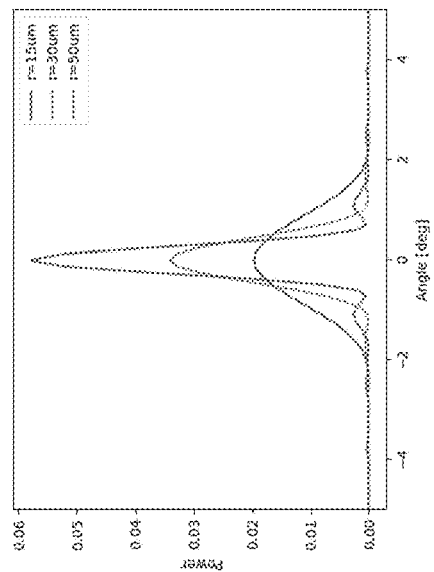
FIG. 7D is a far-field plot of the simulation for various values of outer radius R.
Figure 7A:
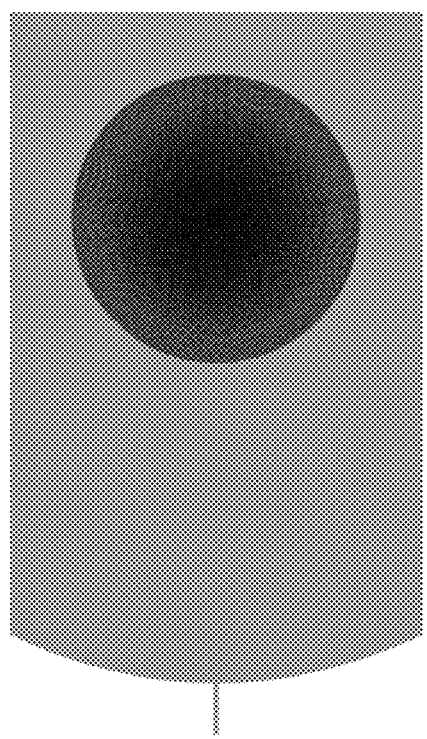
FIG. 7A shows a simulated permittivity profile of a SiN waveguide feeding into a SiN slab and a photonic crystal Luneburg lens, where darker shades correspond to higher permittivity.
Figure 7C:
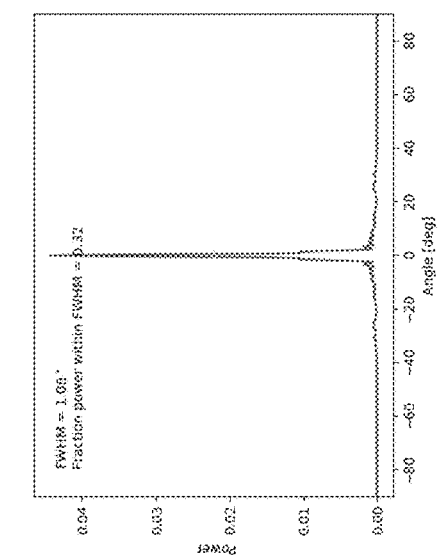
FIG. 7C is a far-field plot of the simulation for a Luneburg lens with an outer radius R=30 µm.

FIG. 7A shows the permittivity profile of the SiN waveguide, SiN slab, and photonic-crystal Luneburg lens, where darker shades correspond to higher permittivity. FIG. 7B shows the H-field of the simulation after convergence. Light coming in from the waveguide is collimated by the lens. FIG. 7C shows a far-field plot of the simulated beam profile for a beam collimated by a Luneburg lens with an outer radius R=30 µm. FIG. 7D shows a far-field plot of the simulation for outer radii of 15 µm (lowest peak), 30 µm (middle peak), and 50 µm (highest peak). This simulation shows that increasing the Luneburg lens's outer radius and hence its focal length decreases the beam divergence angle.

Figure 8B:
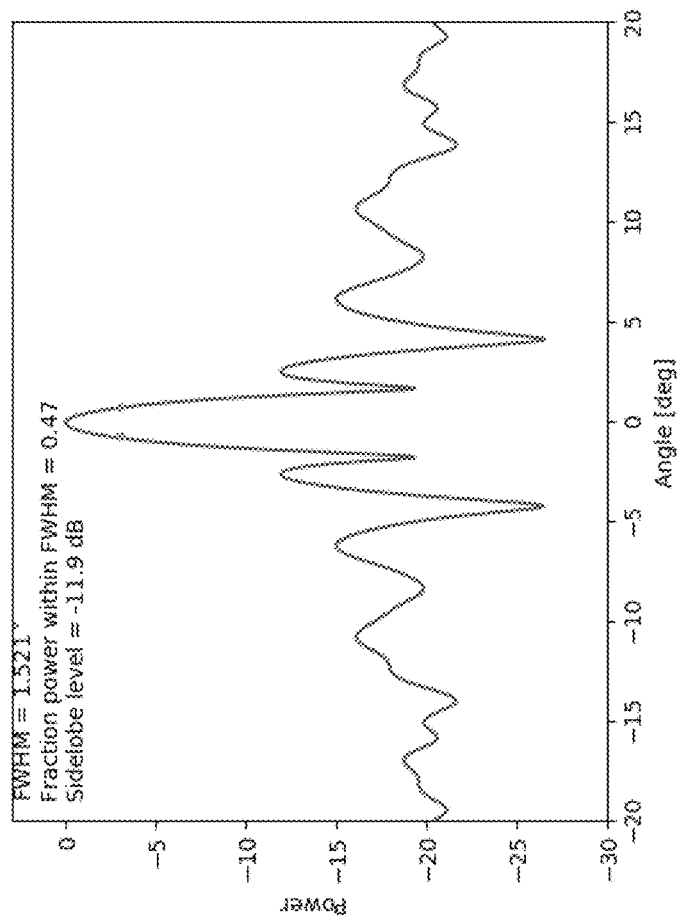
FIG. 8B is a plot of power versus angle for a planar metamaterial Luneburg lens.
Figure 8A:
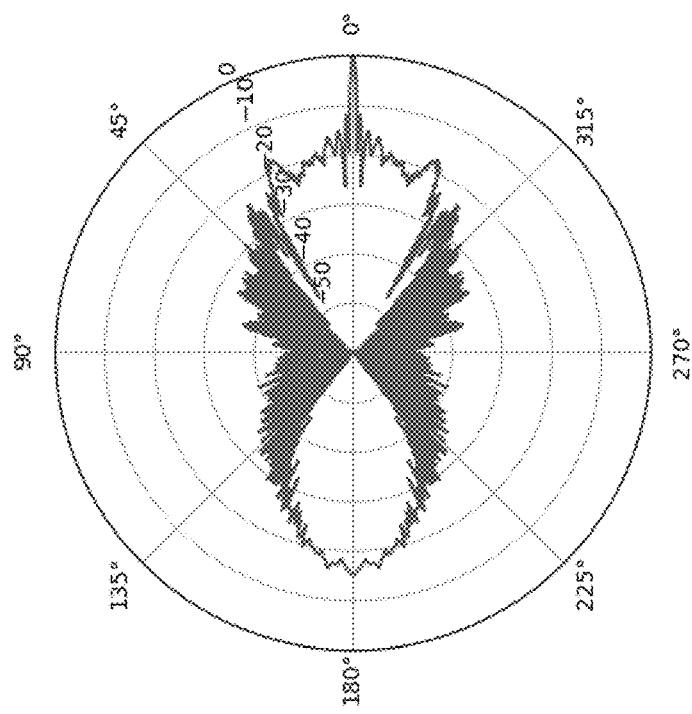
FIG. 8A is a polar plot of the far-field of a planar metamaterial Luneburg lens.

FIGS. 8A and 8B are plots of 2D, full-wave simulations of a planar metamaterial Luneburg lens with an outer lens radius of R=30 µm and a normalized lens focal length of s=3. FIG. 8A is a polar plot of the lens's far-field, and FIG. 8B shows power versus angle. The full-width half-maximum (FWHM) of the central lobe in the far-field is relatively small at 1.521°, indicating good collimation (little divergence). The central lobe contains about 47% of the total beam power, and the sidelobe level is about −11.9 dB.

Figure 9A:
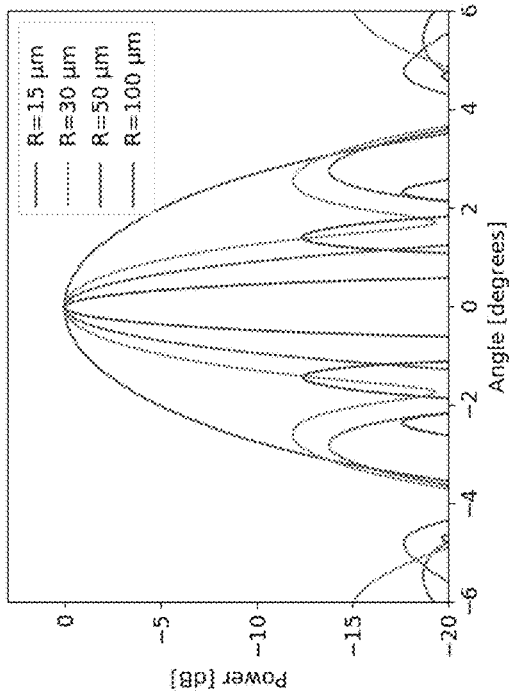
FIG. 9A is a plot of power versus angle for an ideal Luneburg lens (trace with lower sidelobes) and a photonic crystal Luneburg lens (trace with higher sidelobes).
Figure 9B:
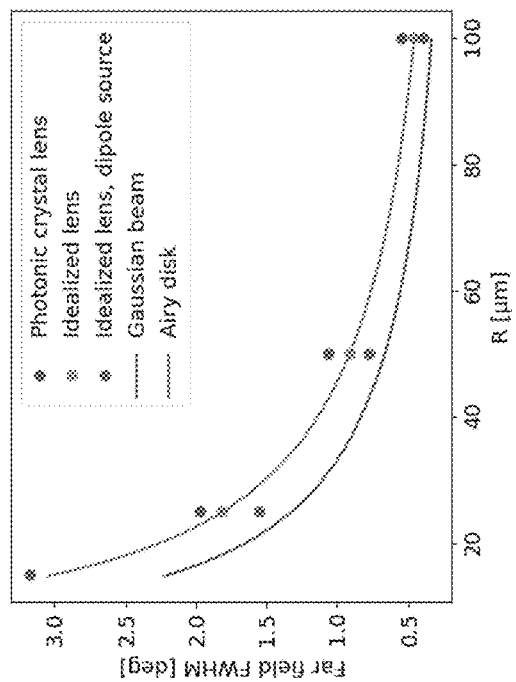
FIG. 9B is a plot of center (main) lobes and side lobes for planar Luneburg lenses with outer lens radii of R=15 µm, 30 µm, 50 µm, and 100 µm.
Figure 9C:
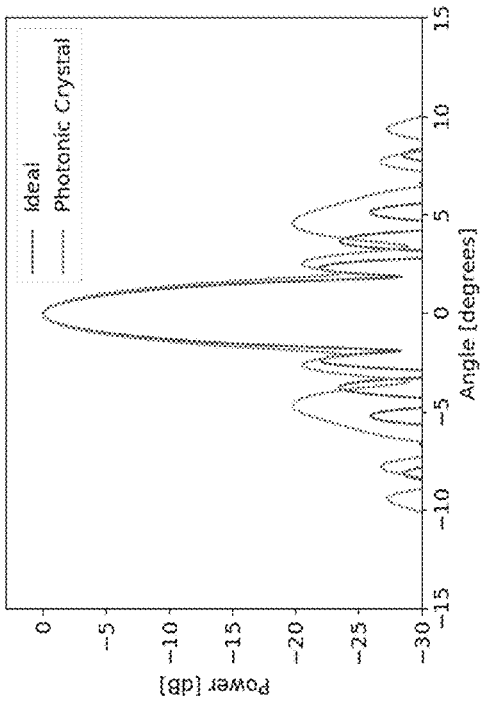
FIG. 9C is a plot of fractional change in full-width half-maximum (FWHM) for a beam from a Luneburg lens at different lens rotation angles and outer lens radii of R=25 µm and 50 µm.
Figure 9D:
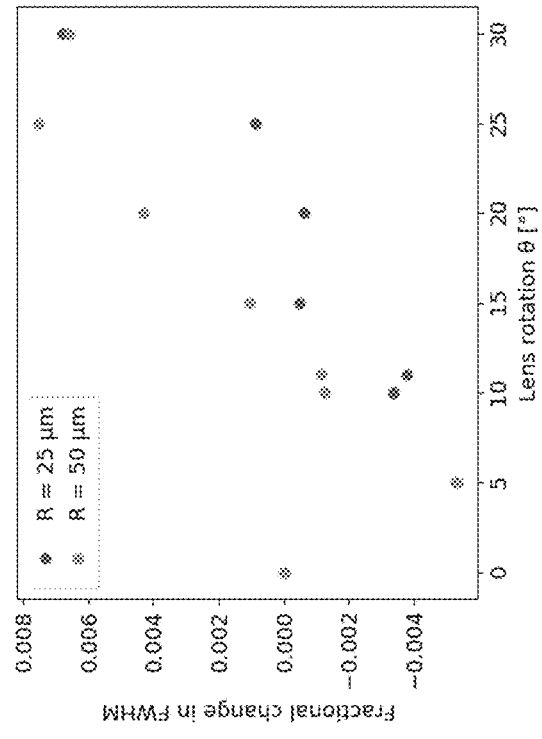
FIG. 9D is a plot of far-field FWHM versus radius for different Luneburg lenses.

FIGS. 9A-9D show simulated collimation performance for different planar Luneburg lenses. FIG. 9A is a plot of power versus angle for both ideal and photonic-crystal Luneburg lenses with outer lens radii of R=30 µm and normalized lens focal lengths of s=3. The main lobes are nearly identical, and the power in the sidelobes is only a few decibels higher for the photonic-crystal Luneburg lens. FIG. 9B shows power versus angle for the main lobe from Luneburg lenses with outer radii of 15 µm, 30 µm, 50 µm, and 100 µm and a normalized lens focal length of s=3. Again, the FWHM decreases and the sidelobe levels increase with increasing outer radius. FIG. 9C is a plot of fractional change in FWHM versus lens rotation angle (incident beam angle) for Luneburg lenses with outer radii of 25 µm and 50 µm and a normalized lens focal length of s=3. For both lenses, the fractional change is less than 1% over an angular range of over 30°. And FIG. 9D is a plot of far-field FWHM versus outer radius for different types of lenses and beams, including a photonic crystal lens, an idealized lens, and an idealized lens illuminated by a dipole source, which behaves as a point source. For reference, the plot also shows the FWHM of a Gaussian beam with waist size equal to the lens size and an Airy disk with aperture equal to the lens size.

Figure 10C:
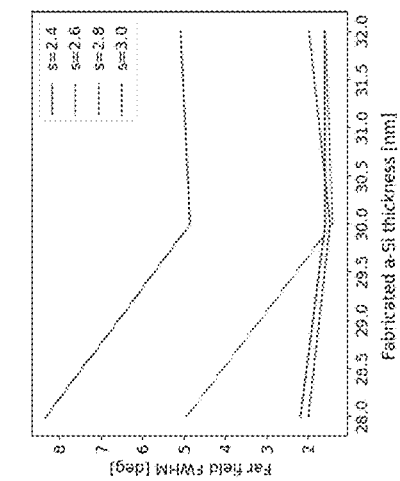
FIG. 10C is a plot of far-field FWHM versus silicon thickness for photonic crystal Luneburg lenses with different normalized lens focal lengths s.
Figure 10B:
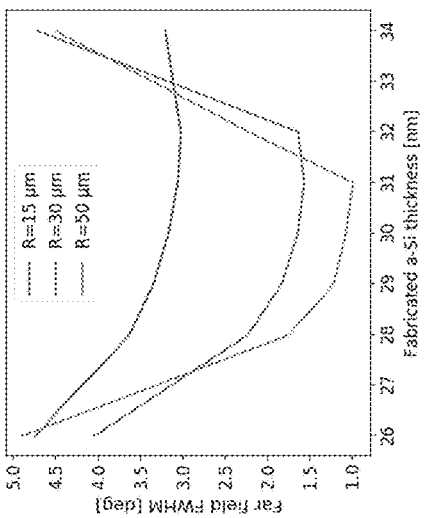
FIG. 10B is a plot of far-field FWHM versus silicon thickness for photonic crystal Luneburg lenses with hexagonal lattice of holes with radii of 50 µm (bottom trace), 30 µm (middle trace), and 15 µm (top trace).
Figure 10A:
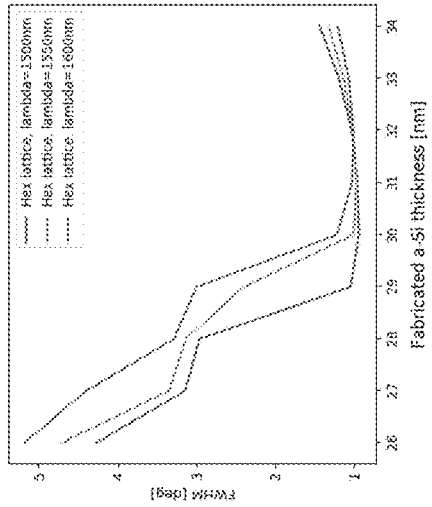
FIG. 10A is a plot of far-field FWHM versus silicon thickness for a photonic crystal Luneburg lens with a hexagonal lattice of holes illuminated at wavelengths of 1500 nm (bottom trace), 1550 nm (middle trace), and 1600 nm (top trace).

FIGS. 10A-10C illustrate a metamaterial Luneburg lens's robustness to fabrication imperfections, including variations in the thickness of the a-Si layer. The simulated Luneburg lens has a design wavelength of 1550 nm and 30 nm diameter holes on a hexagonal lattice in a-Si. To simulate variation of the thickness of the lens's a-Si layer in 2D, the material properties of a-Si were modified to fit the expected effective index. The effects of changing wavelength in a range of 1500-1600 nm were also included in the simulation. In this case, the material parameters, waveguide source, and far-field monitors were adjusted. Robustness to fabrication variations was checked by varying the size of the holes by about 10 nm.

The results plotted in FIGS. 10A-10C show that lens performance is robust to changes in a-Si thickness, wavelength, and hole size. FIG. 10A shows the FWHM of the main lobe of a Luneburg lens versus a-Si thickness for wavelengths of 1500 nm (bottom trace), 1550 nm (middle trace), and 1600 nm (top trace). Each trace follows that same general trend, with higher divergence at a-Si thicknesses less than about 30 nm. The traces coincide within less than 1° for a-Si thicknesses of about 30 nm to about 35 nm. FIG. 10B shows the FWHM of the main lobe of the Luneburg lens versus a-Si thickness for lens outer radii of 15 µm (top trace), 30 µm (middle trace), and 50 µm (bottom trace). The traces coincide within a range of 2° for a-Si thicknesses of about 30 nm to about 35 nm. FIG. 10C shows the FWHM versus a-Si thickness for different values of normalized lens focal length s=2.4 (top trace), 2.6 (upper middle trace), 2.8 (bottom trace), and 3.0 (lower middle trace).

Figure 11A:
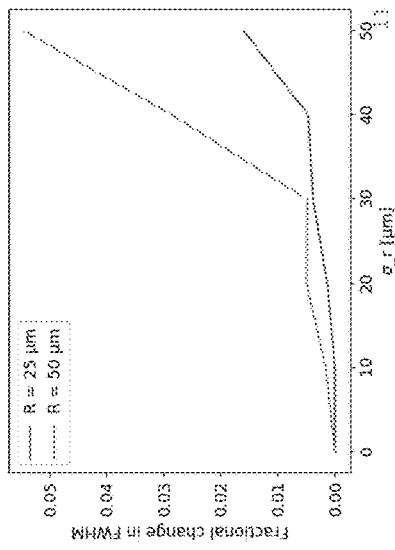
FIG. 11A is a plot of fractional change in FWHM versus mean Gaussian noise applied to the hole diameter for photonic crystal Luneburg lenses with hexagonal lattices of holes with outer lens radii of 25 µm (top trace) and 50 µm (bottom trace).
Figure 11B:
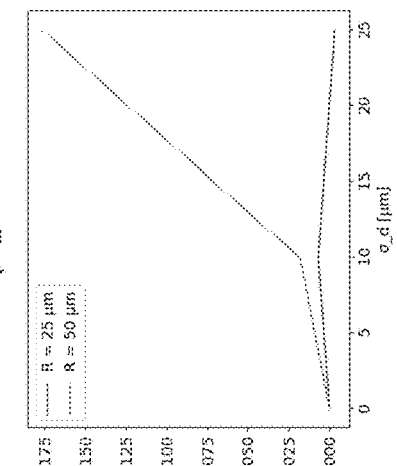
FIG. 11B is a plot of fractional change in FWHM versus the standard deviation of Gaussian noise applied to the hole diameter for photonic crystal Luneburg lenses with hexagonal lattices of holes with outer lens radii of 25 µm (top trace) and 50 µm (bottom trace).
Figure 11C:
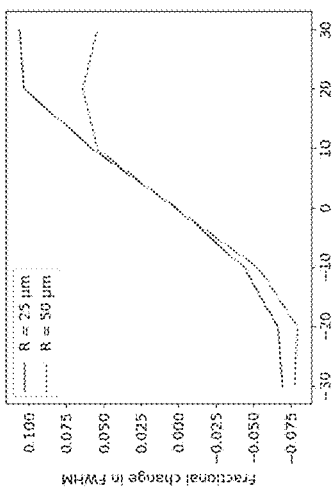
FIG. 11C is a plot of fractional change in FWHM versus hole offset for photonic crystal Luneburg lenses with hexagonal lattice of holes with outer lens radii of 25 µm (top trace) and 50 µm (bottom trace).

FIGS. 11A-11C show the effect of fabrication tolerances on the hole sizes in metamaterial Luneburg lenses with outer radii of 25 µm and 50 µm. FIGS. 11A and 11B are plots of the fractional change in far-field, main-lobe FWHM versus the mean µ and standard deviation σ, respectively, of Gaussian noise applied to the hole diameters. FIG. 11C shows the fractional change in main-lobe FWHM versus the standard deviation of Gaussian noise applied to the hole position.

Semi-Circular Grating

Figure 12A:
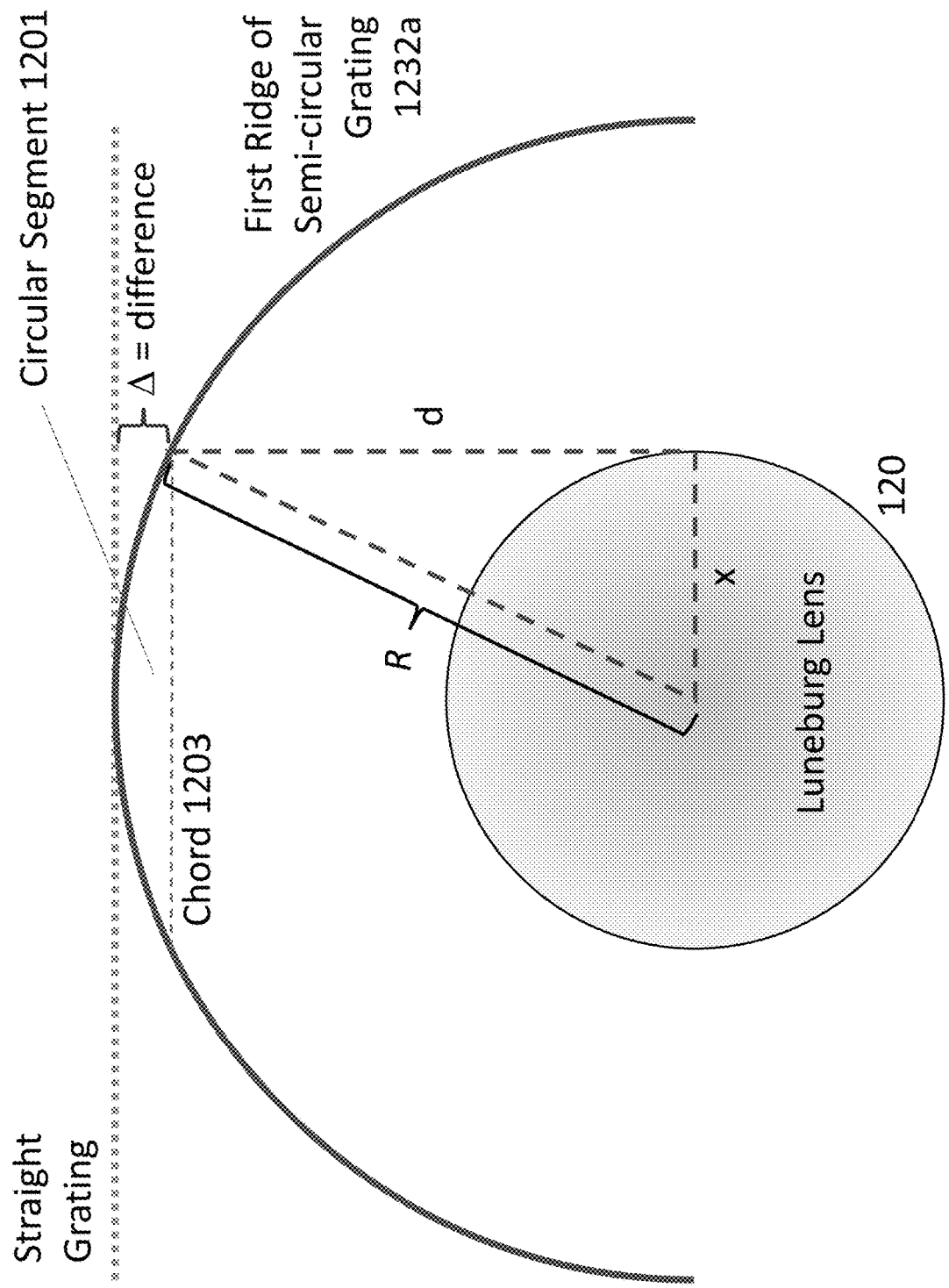
FIG. 12A is a plan view illustrating the curvature of the first ruling or a semi-circular grating used to direct light collimated by a planar Luneburg lens out of the plane of the planar Luneburg lens.

FIG. 12A shows the first ridge 1232a of a curved circularly shaped grating 130 (FIG. 1A) that couples the collimated optical beam out of the plane of the Luneburg lens 120. To ensure the desired diffraction, the radius of curvature of the first ruling 1232a of the grating 130 is chosen so that the difference Δ between the circular segment 1201 and its corresponding chord 1203, whose length equals the width of the collimated optical beam 123 (FIG. 1A), is as small as a possible. (A circular segment is a portion of a disk whose upper boundary is a (circular) arc and whose lower boundary is a chord 1203 making a central angle that is less than 180 degrees.) Put differently, the inner radius of the grating's first ruling should approximate a straight line over a distance equal to the width of the collimated optical beam 123, e.g., to within a desired percent from an ideal straight grating.

The grating 130 should "appear straight" so that the pitch/periodicity of the grating does not change when viewed off-axis. If the grating pitch "appears" different, the grating's angle of emission will change off-axis, creating a distorted mapping of points out into the far-field. Experimentally, the emission going off-axis creates an arc that is pointed in the downward direction. Meaning that the lowest points of the arc occur at the most extreme off-angle axis (±angles). The center of the arc (and the highest point) is created by the mode hitting the grating 130 at 0°.

The minimum radius of the first ruling 1232a of the grating 130 can be found using this equation:

$$\left(\frac{d}{R}\right)^2 + \left(\frac{x}{R}\right)^2 = 1$$

In this equation, R is the desired radius for the first tooth or ridge 1232a of the circular grating, x is the radius of the lens (distance to the left or right edge of the lens), d is the distance from the radius of the lens (left or right edge of the lens) to the segment of the grating 130 that should be approximately linear. The ratio of d/R depends on the application and system performance goals. For improved beam quality, the ratio d/R should remain equal to or greater than 0.99 (99%) to ensure that the collimated beam undergoes coupling by an approximately linear section of the grating with no more than 1%, d=(1−0.01)R, deviation from a straight line.

The Pythagorean Theorem, $R^2=x^2+d^2$ can also be used to determine R, the inner radius of the circular grating. Solving for R provides full control of radius and the resulting error in the grating 130.

Instead of making the grating "appear straight" to the collimated beam, the Luneburg lens's focus can be adjusted to compensate for the grating curvature. For instance, the focus can be adjusted to make the beam divergence of the collimated beam equivalent to the arc of the grating. This improves the beam quality in the polar direction/cross-section of the beam. However, there may be a trade-off: creating a non-collimated beam in the azimuthal/in-plane direction may increase the beam divergence of the beam in the polar direction/cross-section of the beam.

Alternatively, the grating could be a polygonal arc, with each side/facet of the polygonal arc centered on the collimated beam from a corresponding side of the polygonal arc. If each arc is long enough (i.e., at least as long the beam diameter), then each collimated beam would experience its own "straight" grating that may be simpler to make than a corresponding circular grating. The grating coupler could also be implemented as a 2D photonic crystal lattice. A variation of 2D photonic crystal lattices can be implemented including but not limited to a hexagonal lattice with six-fold rotational symmetry like the Luneburg lens. The 2D lattice can be closer to the lens and can provide a uniform emission from the aperture.

Single- and Double-Layer Curved Gratings

Figure 12B:
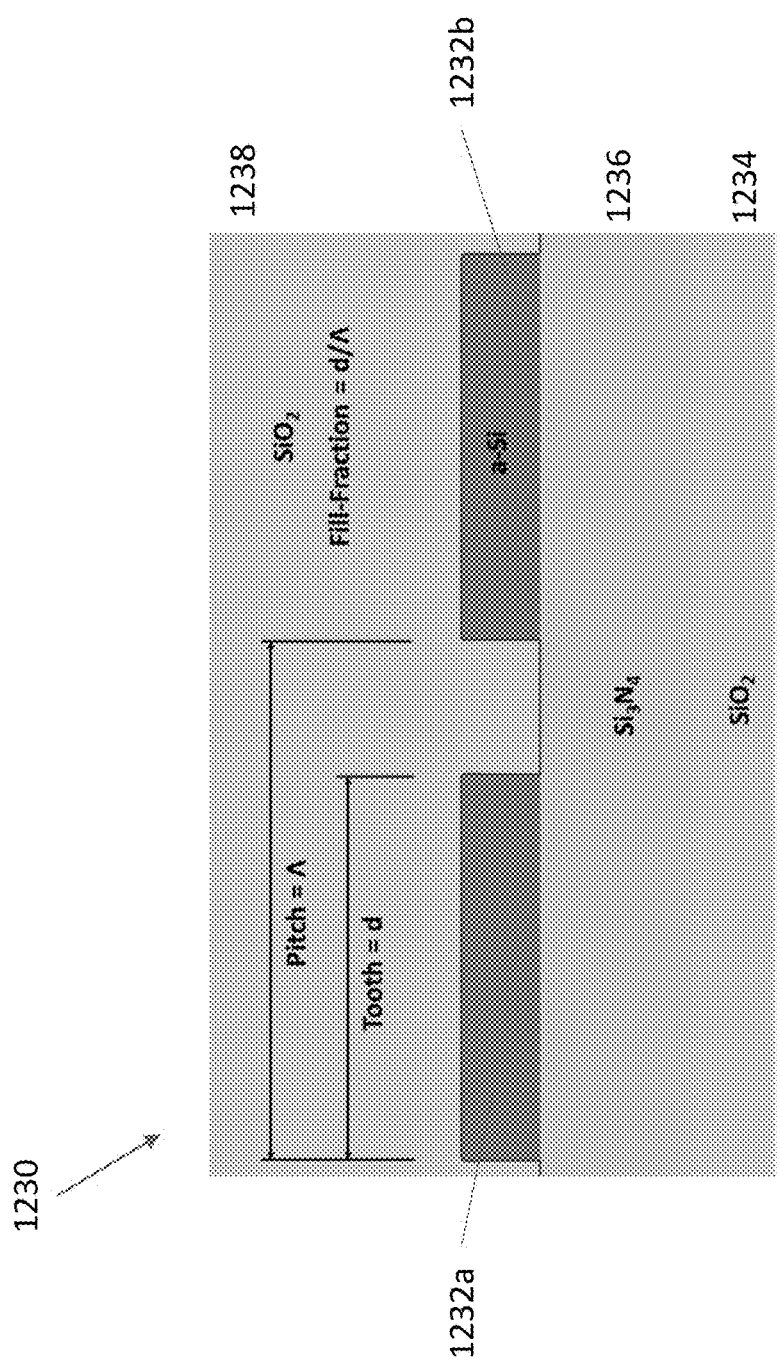
FIG. 12B is a cross-section of a grating used to direct light collimated by a planar Luneburg lens out of the plane of the planar Luneburg lens.

The grating used to couple light out of the plane of the Luneburg lens can be a single-layer grating or a double-layer grating. FIG. 12B shows two teeth/rulings 1232a and 1232b (collectively, teeth or rulings 1230) of a single-layer grating 1230. The rulings or teeth 1230 are coated in a conformal cladding 1238 (e.g., an $SiO_2$ cladding) and are made of a-Si deposited on a $Si_3N_4$ layer 1236, which is in turn on a $SiO_2$ layer 1234. The a-Si grating rules 1230 are in the same plane as the a-Si Luneburg lens (not shown).

The fill-fraction (also known as the duty cycle) of the single-layer grating 1230 in FIG. 12B is defined as the ratio between the width d of a single tooth 1232 of the grating and the pitch Λ of the grating. The single-layer grating can have a fill-fraction that (i) is constant along the direction of the grating vector, (ii) changes linearly between 0 and 1 along the direction of the grating vector, or (iii) changes non-linearly between 0 and 1 along the direction of the grating vector. If desired, the grating fill fraction can be apodized as described below.

A single-layer grating may have a lower diffraction efficiency than other types of gratings and thus a larger aperture (because it diffracts light more gradually as a function of length) and lower beam divergence angle (because it has a larger aperture). The grating's diffraction efficiency may be lowered further by reducing the thickness of the grating rulings (teeth).

Figure 13B:
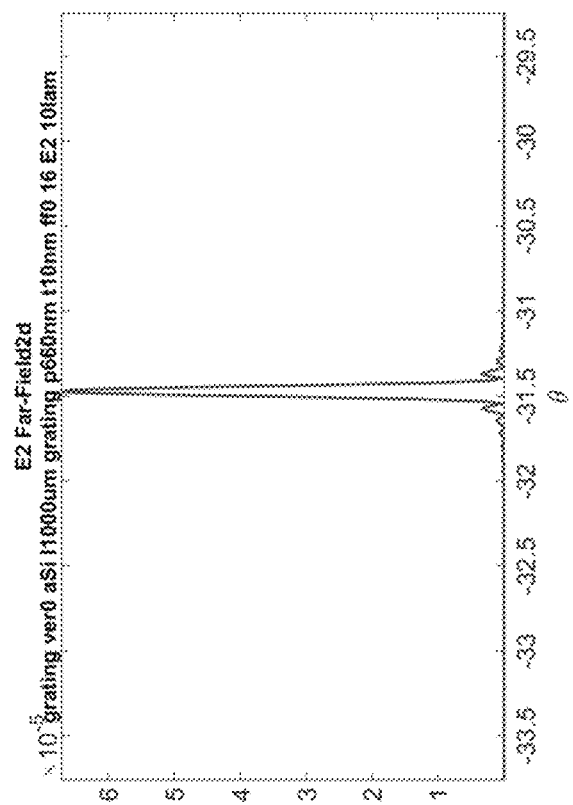
FIG. 13B is a plot of the 0.1° beam divergence in the far-field for the grating modeled in FIG. 11A.
Figure 13A:
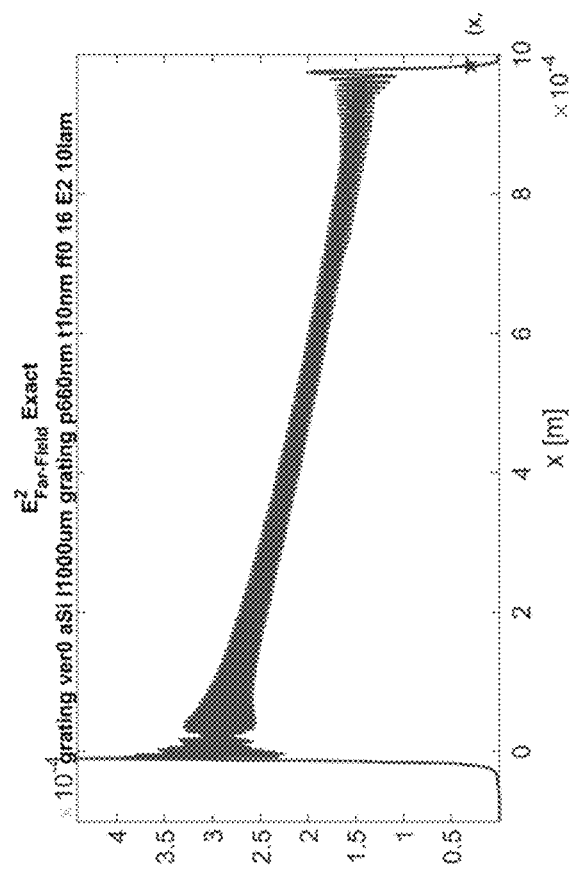
FIG. 13A is a plot of the of the electric field squared ($E^2$) along the length of a single-layer grating composed of a-Si on top of SiN with a length of 1000 µm, a pitch of 660 nm, an a-Si thickness of 10 nm, and a fill fraction of 0.16.

FIG. 13A shows the electric field squared ($E^2$) along a cross-section of a single-layer, a-Si grating with a length of 1000 μm, a pitch of 660 nm, an a-Si thickness of 10 nm, and a fill-fraction of 0.16. The beam diffracted by this grating has a low beam divergence angle of 0.1° as shown in FIG. 13B.

A grating composed of at least two layers (a double-layer grating) can create deconstructive interference in one direction orthogonal to the plane of the optical beam-steering chip's surface and constructive interference on the opposite side. Producing stronger emission from one side of the grating (e.g., the top side) is done by breaking the symmetry of the grating structure in the direction perpendicular to the slab containing the Luneburg lens. Emitting most or all of the light from one side of the slab increases the optical efficiency of the optical beam-steering chip.

One type of double-layer grating has two different layers directly on top of each other. Each layer contains a grating, with the upper grating phase-shifted with respect to the lower grating, e.g., by about π/2, to increase or maximize constructive interference of the light upwards. The two layers can be comprised of different materials and have the same or different thicknesses. They can also be formed of the same type of material and be separated by another layer formed of a different material. In either case, the layers should be made of materials whose effective refractive indices are higher than the refractive index of the surrounding cladding. (The effective refractive index is determined by the thickness of the layer, surrounding cladding material, and the bulk refractive index of the material.) Layers formed of different materials can be next to each other or separated by another layer, which can be made of the cladding material with a thickness selected to increase constructive interference upwards between the light emitted from each of the two layers.

The two layers can contain gratings with fill-fractions that (i) are constant along the direction of the grating vector, (ii) change linearly between 0 and 1 along the direction of the grating vector, or (iii) change non-linearly between 0 and 1 along the direction of the grating vector. Again, the grating fill fractions can be apodized as described below, with the same type of apodization applied to the top and bottom layers. Reducing the gratings' diffraction efficiencies increases the aperture size and decreases the beam divergence. To lower the grating's diffraction efficiency, the grating should be weak—the difference in effective index between the various teeth and gaps in the grating should be small.

The layers of the double-layer grating line up with the Luneburg lens as follows. If silicon nitride (SiN) is the first layer of the double-layer grating and amorphous silicon (a-Si) is the second layer of the double-layer grating, the holes for the Luneburg lens are drilled in the second layer. The top layer of the double-layer grating can also be deposited/patterned in the second layer (a-Si), whereas the bottom layer of the double-layer grating is in the first layer (SiN). Of course, the first and second layers of the double-layer grating can be other dielectric materials. The first layer can have a higher refractive index then the second layer or vice versa.

Grating Apodization

An apodization function can be applied to the fill-fraction of the grating design. The apodization can be used to create a smoother transition from the refractive index of the slab waveguide containing the lens and the refractive index of the surrounding $SiO_2$ cladding environment. Example apodization functions include linear, half-Gaussian, and full-Gaussian apodization functions. A linearly increasing or decreasing apodization function for the SiN layer increases or decreases the fill-fraction value to create a smooth transition in the refractive index of the grating. In a half-Gaussian apodization, the fill fraction increases or decreases with length according to a half of a Gaussian distribution. And in a full-Gaussian apodization, the fill fraction increases and then decreases or vice versa according to a Gaussian distribution.

Figures 14A, 14B:
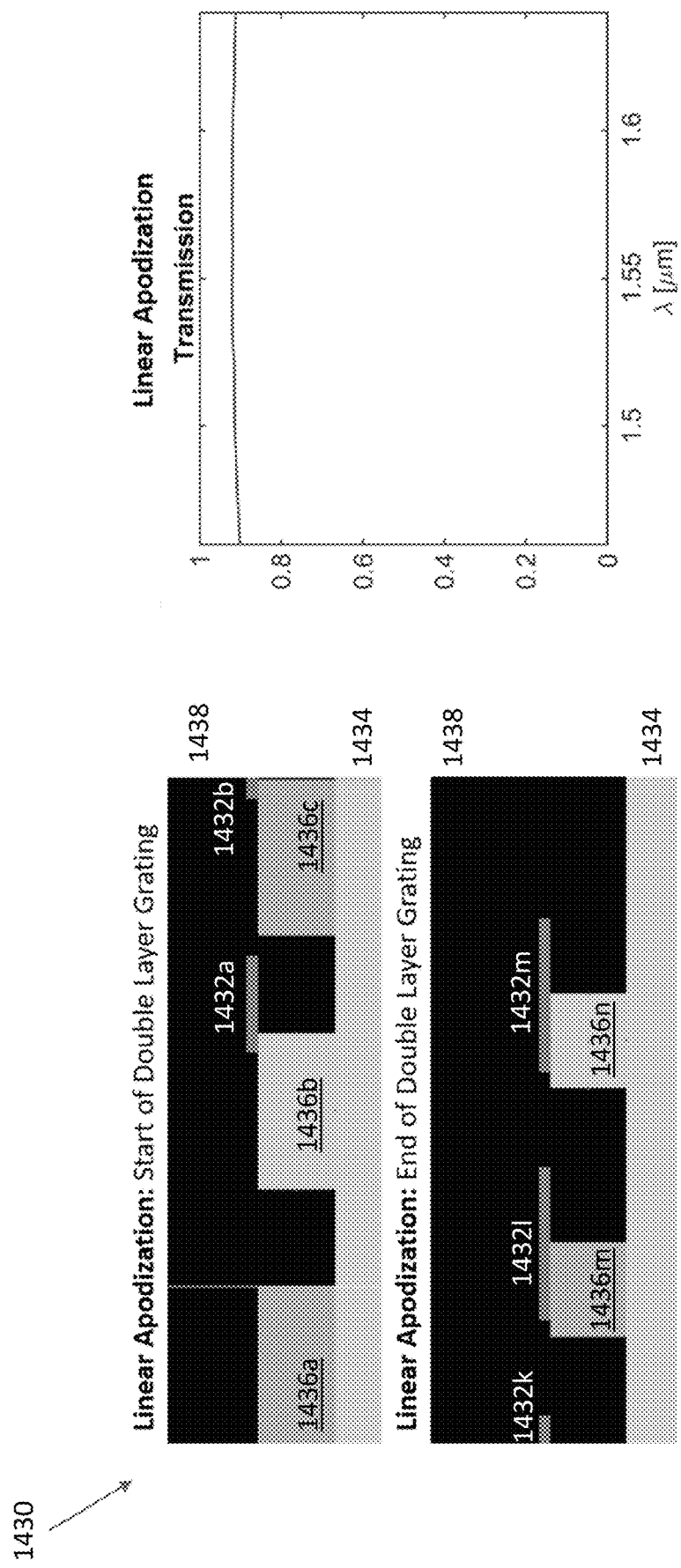
FIG. 14A shows cross-sections of the ends of a linearly apodized, double-layer grating with a top layer offset showing that the top grating is linearly increasing in fill-fraction and the bottom grating is linearly decreasing in fill-fraction.
FIG. 14B shows the transmission of the linearly apodized, double-layer grating, with constructive interference in the upward direction producing an average upward transmission equal to 90 percent.

FIG. 14A shows the cross-section of a double-layer grating 1430 with a linearly apodized top layer that is shifted with respect to a linearly apodized bottom layer. For example, the top layer can be shifted by approximately $\pi/2$. However, the shift of the layer is not limited to $\pi/2$. The shift for the top layer can be determined by simulating and optimizing the beam divergence and increasing or maximizing the far-field power (or any other desired beam characteristic) emitted from the double-layer grating. The top layer includes upper grating rulings 1432a-1432m (collectively, upper grating rulings 1432) made of a-Si that partially overlap with lower grating rulings 1436a-1436n (collectively, lower grating rulings 1436) made of SiN in the lower layer, which in turn is on a $SiO_2$ layer 1434. The upper grating rulings 1432 and lower grating rulings 1436 are clad in a material whose refractive index is lower than a-Si and SiN.

The upper grating rulings 1432 increase linearly in width and duty cycle (fill fraction) with distance from the Luneburg lens, whereas the lower grating rulings 1436 decrease linearly in width and duty cycle (fill fraction) with distance from the Luneburg lens. In other words, the bottom SiN layer linearly decreases in fill-fraction from the start to end of the grating and the top a-Si linearly increases in fill-fraction from the start to end of the grating. The slopes of the apodization functions can be the same or different. This double-layer structure with linear apodization produces constructive interference in the upward direction and destructive interference in the downward direction and has an average transmission of 90% transmission in the upward direction, as shown in FIG. 14B.

A Gaussian distribution can be implemented by using either a half or full distribution of the fill-fraction. The limits of the Gaussian function are set by determining the highest and lowest fill-fractions in a dielectric or semiconductor material and layer:

$$f(x) = f_{start} + (f_{end} - f_{start})e^{-(x-\mu)^2/2\sigma^2}$$

The mean, $\mu=0$, and distribution of the input x ranges from −3 to +3. This provides a fill fraction ranging between 0.0 and 1.0. The fill-fraction distribution can be discretized for any number of points (n). This discretization provides the fill-fraction for each tooth (ruling) of the grating. The lowest and highest fill-fraction values are determined by the fabrication constraints used in the lithography process. By holding all other variables constant and varying the Gaussian's width, $\sigma^2$, the apodization of the grating can be further engineered by either broadening or sharpening the Gaussian peak.

Figure 15B:
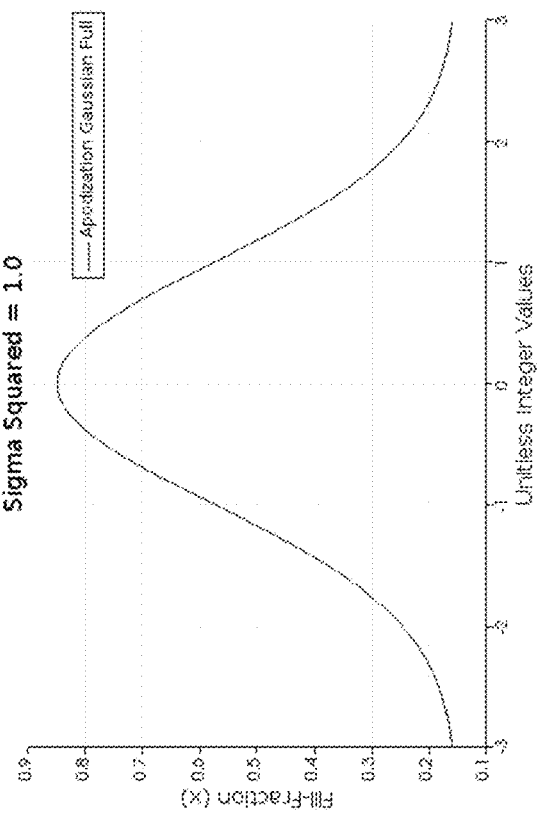
FIG. 15B shows a symmetric Gaussian distribution function for grating apodization.
Figure 15A:
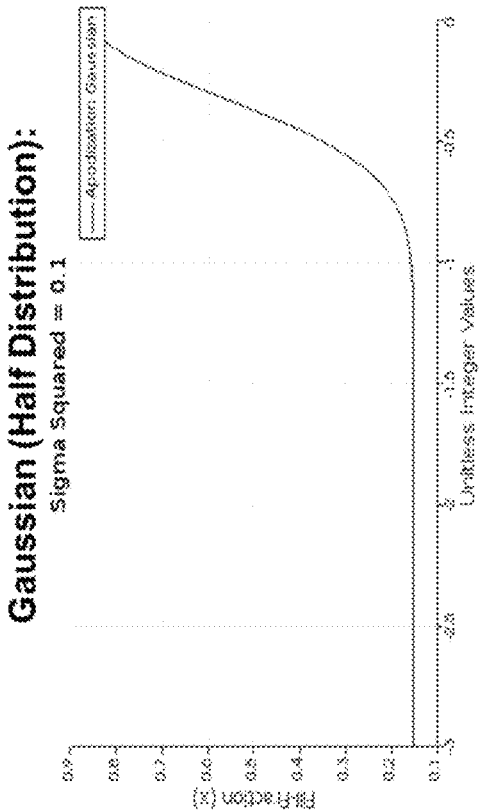
FIG. 15A shows an increasing half-Gaussian distribution function for grating apodization.

FIGS. 15A and 15B are example plots of the fill-fraction distribution with the values of f(x) across the grating. FIG. 15A shows a half-Gaussian distribution function that is increasing while FIG. 15B shows a symmetric full-Gaussian distribution.

FIG. 16A shows a profile views of the start (top) and end (bottom) of a half-Gaussian apodized, double-layer grating 1630 with a top layer offset. The offset can be determined numerically to increase or maximize constructive interference (transmission) upwards and may be about $\lambda/4$ ($\lambda/8$ for a full Gaussian apodization). The top (a-Si) grating has rulings 1632a-1632m with widths and fill-fractions that increase with distance from the Luneburg lens according to a half-Gaussian distribution. The bottom (SiN) grating is on an oxide layer 1634 has rulings 1636a-1636n with widths and fill-fractions that decrease with distance from the Luneburg lens according to another half-Gaussian distribution, which may be the same or different. There is cladding 1638 on the upper and lower grating layers. The half-Gaussian apodizations create smooth transitions in the refractive indices of the grating layers. The two grating layers produce constructive interference for an average transmission equal to 90 percent in the upward direction, as shown in FIG. 16B.

A full-Gaussian apodization for both grating layers has a symmetric distribution for the fill-fraction. The lowest fill-fraction is used at the start and end of the grating. The highest fill-fraction value is used in the middle of the grating. The shift for the top layer with a full-Gaussian distribution can be but is not limited to a $\pi/2$ phase shift. Solutions can be found at less then a $\pi/2$ phase shift.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical beam steering apparatus comprising:
   a substrate;
   a waveguide array formed on the substrate, the waveguide array comprising a first waveguide and a second waveguide;
   a planar Luneburg lens, formed on the substrate in optical communication with the waveguide array, to collimate light emitted by the first waveguide as a first collimated beam propagating in a first direction in a plane of the substrate and to collimate light emitted by the second waveguide as a second collimated beam propagating in a second direction in the plane of the substrate different than the first direction; and
   a curved grating, formed on the substrate in optical communication with the planar Luneburg lens, to couple at least a portion of the first collimated beam and the second collimated beam out of the plane of the substrate,
   wherein the planar Luneburg lens comprises a dielectric material patterned with holes having radii smaller than a wavelength of the light, the holes being spaced at a pitch smaller than the wavelength of the light.

2. The optical beam steering apparatus of claim 1, wherein the waveguide array has outputs disposed on a circle concentric with the planar Luneburg lens and the curved grating.

3. The optical beam steering apparatus of claim 2, wherein the planar Luneburg lens has a focal length equal to the radius of curvature of the circle.

4. The optical beam steering apparatus of claim 1, wherein the planar Luneburg lens has a field of view of at least 100°.

5. The optical beam steering apparatus of claim 1, wherein the radii of the holes vary with distance from the center of the planar Luneburg lens.

6. The optical beam steering apparatus of claim 1, wherein the planar Luneburg lens comprises amorphous silicon deposited on a layer of silicon nitride.

7. The optical beam steering apparatus of claim 6, wherein the amorphous silicon is patterned with holes having radii ranging from about 50 nm to about 150 nm on a hexagonal lattice with a pitch ranging from about 300 nm to about 500 nm.

8. The optical beam steering apparatus of claim 1, wherein the curved grating has a ruling that is a distance d from the Luneburg lens and an inner radius of curvature R selected such that d/R is equal to or greater than 0.99.

9. The optical beam steering apparatus of claim 1, wherein the curved grating has a grating fill factor that varies with distance from the Luneburg lens.

10. The optical beam steering apparatus of claim 1, wherein the curved grating comprises a first grating layer disposed on and shifted with respect to a second grating layer.

11. The optical beam steering apparatus of claim 1, further comprising:
a tunable light source, in optical communication with the waveguide array, to tune a wavelength of the light emitted by the first waveguide and the light emitted by the second waveguide.

12. The optical beam steering apparatus of claim 11, further comprising:
a network of optical switches, formed on the substrate in optical communication with the tunable light source and the waveguide array, to guide the light emitted by the first waveguide from the tunable light source to the first waveguide when in a first state and to guide the light emitted by the second waveguide from the tunable light source to the second waveguide when in a second state.

13. The optical beam steering apparatus of claim 1, further comprising:
a slab waveguide, formed on the substrate in optical communication with the waveguide array and the planar Luneburg lens, to guide the light from the first waveguide and the light from the second waveguide to the planar Luneburg lens.

14. An optical beam steering apparatus comprising:
a substrate;
a waveguide array formed on the substrate, the waveguide array comprising a first waveguide and a second waveguide;
a planar Luneburg lens, formed on the substrate in optical communication with the waveguide array, to collimate light emitted by the first waveguide as a first collimated beam propagating in a first direction in a plane of the substrate and to collimate light emitted by the second waveguide as a second collimated beam propagating in a second direction in the plane of the substrate different than the first direction; and
a curved grating, formed on the substrate in optical communication with the planar Luneburg lens, to couple at least a portion of the first collimated beam and the second collimated beam out of the plane of the substrate,
wherein the planar Luneburg lens comprises amorphous silicon deposited on a layer of silicon nitride, and
wherein the amorphous silicon is patterned with holes having radii ranging from about 50 nm to about 150 nm on a hexagonal lattice with a pitch ranging from about 300 nm to about 500 nm.

15. An optical beam steering apparatus comprising:
a substrate;
a waveguide array formed on the substrate, the waveguide array comprising a first waveguide and a second waveguide;
a planar Luneburg lens, formed on the substrate in optical communication with the waveguide array, to collimate light emitted by the first waveguide as a first collimated beam propagating in a first direction in a plane of the substrate and to collimate light emitted by the second waveguide as a second collimated beam propagating in a second direction in the plane of the substrate different than the first direction; and
a curved grating, formed on the substrate in optical communication with the planar Luneburg lens, to couple at least a portion of the first collimated beam and the second collimated beam out of the plane of the substrate,
wherein the curved grating has a ruling that is a distance d from the Luneburg lens and an inner radius of curvature R selected such that d/R is equal to or greater than 0.99.

16. An optical beam steering apparatus comprising:
a substrate;
a waveguide array formed on the substrate, the waveguide array comprising a first waveguide and a second waveguide;
a planar Luneburg lens, formed on the substrate in optical communication with the waveguide array, to collimate light emitted by the first waveguide as a first collimated beam propagating in a first direction in a plane of the substrate and to collimate light emitted by the second waveguide as a second collimated beam propagating in a second direction in the plane of the substrate different than the first direction; and
a curved grating, formed on the substrate in optical communication with the planar Luneburg lens, to couple at least a portion of the first collimated beam and the second collimated beam out of the plane of the substrate,
wherein the curved grating has a grating fill factor that varies with distance from the Luneburg lens.

17. An optical beam steering apparatus comprising:
a substrate;
a waveguide array formed on the substrate, the waveguide array comprising a first waveguide and a second waveguide;
a planar Luneburg lens, formed on the substrate in optical communication with the waveguide array, to collimate light emitted by the first waveguide as a first collimated beam propagating in a first direction in a plane of the substrate and to collimate light emitted by the second waveguide as a second collimated beam propagating in a second direction in the plane of the substrate different than the first direction; and
a curved grating, formed on the substrate in optical communication with the planar Luneburg lens, to couple at least a portion of the first collimated beam and the second collimated beam out of the plane of the substrate,
wherein the curved grating comprises a first grating layer disposed on and shifted with respect to a second grating layer.

* * * * *